US012353248B2

(12) United States Patent
Xu et al.

(10) Patent No.: US 12,353,248 B2
(45) Date of Patent: *Jul. 8, 2025

(54) FLEXIBLE DISPLAY PANEL AND DISPLAY APPARATUS

(71) Applicant: KunShan Go-Visionox Opto-Electronics Co., Ltd, Jiangsu (CN)

(72) Inventors: Gusheng Xu, Kunshan (CN); Desong Yan, Kunshan (CN)

(73) Assignee: KunShan Go-Visionox Opto-Electronics Co., Ltd, Kunshan (CN)

( * ) Notice: Subject to any disclaimer, the term of this patent is extended or adjusted under 35 U.S.C. 154(b) by 347 days.

This patent is subject to a terminal disclaimer.

(21) Appl. No.: 17/860,584

(22) Filed: Jul. 8, 2022

(65) Prior Publication Data

US 2022/0342449 A1    Oct. 27, 2022

Related U.S. Application Data

(63) Continuation of application No. PCT/CN2020/140444, filed on Dec. 28, 2020.

(51) Int. Cl.
*B32B 7/00* (2019.01)
*G06F 1/16* (2006.01)

(52) U.S. Cl.
CPC .............. *G06F 1/1652* (2013.01); *B32B 7/00* (2013.01); *G06F 1/1656* (2013.01); *B32B 2457/206* (2013.01)

(58) Field of Classification Search
CPC ... B32B 2457/206; B32B 7/00; G06F 1/1624; G06F 1/1637; G06F 1/1652; G06F 1/1656; G09F 9/30; G09F 9/33
See application file for complete search history.

(56) References Cited

U.S. PATENT DOCUMENTS

2013/0135830 A1    5/2013    Lai et al.

FOREIGN PATENT DOCUMENTS

| CN | 105551385 A | 5/2016 |
| CN | 105723295 A | 6/2016 |
| CN | 106097896 A | 11/2016 |

(Continued)

OTHER PUBLICATIONS

Office Action issued on May 24, 2023, in corresponding Chinese Application No. 202080080042.4, 15 pages (with partial English translation).

(Continued)

*Primary Examiner* — Lawrence D Ferguson
(74) *Attorney, Agent, or Firm* — Maier & Maier, PLLC

(57) ABSTRACT

Embodiments of the present application provide a flexible display panel and a display apparatus, the flexible display panel includes a display layer and a layer group; the layer group includes at least one layer; and at least one layer of the layer group has a length in a first direction greater than a length of the display layer in the first direction. The layer group includes an upper layer group located above the display layer and a lower layer group located below the display layer; the upper layer group includes at least one layer; the lower layer group includes at least one layer; at least one layer of the upper layer group and/or the lower layer group has a length in the first direction greater than the length of the display layer in the first direction.

22 Claims, 11 Drawing Sheets

(56) References Cited

FOREIGN PATENT DOCUMENTS

| | | | |
|---|---|---|---|
| CN | 110444113 A | 11/2019 |
| CN | 110570767 A | 12/2019 |
| CN | 110599913 A | 12/2019 |
| CN | 105723295 B | 2/2020 |
| CN | 110969939 A | 4/2020 |
| CN | 111009188 A | 4/2020 |
| CN | 210535212 U | 5/2020 |
| CN | 111933033 A | 11/2020 |
| KR | 1020200033568 A | 3/2020 |
| WO | 2019153257 A1 | 8/2019 |
| WO | 2020065922 A1 | 4/2020 |

OTHER PUBLICATIONS

Notification to Grant Patent Right for Invention issued on Nov. 29, 2023, in corresponding Chinese Application No. 202080080042.4, 6 pages.

International Search Report (with English Translation) and Written Opinion of the International Searching Authority mailed Oct. 9, 2021, in corresponding International Application No. PCT/CN2020/140444, 11 pages.

FLEXIBLE DISPLAY PANEL AND DISPLAY APPARATUS

CROSS REFERENCES TO RELATED APPLICATIONS

The present application is a continuation of International Application No. PCT/CN2020/140444, filed on Dec. 28, 2020 and titled "FLEXIBLE DISPLAY PANEL AND DISPLAY APPARATUS", content of which is incorporated here by reference in its entirety.

TECHNICAL FIELD

The present application relates to the technical field of display panels, and particularly relates to a flexible display panel and a display apparatus.

BACKGROUND

With the development of display technology, a flexible display apparatus with a flexible display panel has gradually entered the market, and has been paid more and more attention in the industry. The flexible display panel of the flexible display apparatus can be unfolded when it is required to display and can be folded when it is not required to display. The folding or unfolding of the flexible display panel can be achieved by sliding or winding, however, since the flexible display panel needs to be connected with a device that helps it to slide or wind, it may cause that part of the display region of the flexible display panel cannot be observed by a user when the flexible display panel is completely unfolded, resulting in that the flexible display panel cannot be fully utilized.

Therefore, there is a need for a method and mechanism that can utilize the display region of a flexible display panel to the greatest extent.

SUMMARY

One of the embodiments of the present disclosure provides a flexible display panel, the flexible display panel includes a display layer and a layer group; the layer group includes at least one layer; and at least one layer of the layer group has a length in a first direction greater than a length of the display layer in the first direction.

In some embodiments, the layer group includes an upper layer group located above the display layer and a lower layer group located below the display layer, the at least one layer comprises a plurality of layers; the upper layer group includes at least one layer of the plurality of layers; the lower layer group includes at least another layer of the plurality of layers; the at least one layer of the upper layer group and/or the at least another layer of the lower layer group has a length in the first direction greater than the length of the display layer in the first direction.

In some embodiments, the layer group includes a lower layer group located below the display layer; the lower layer group includes at least one layer of the at least one layer of the layer group; the at least one layer of the lower layer group has a length in the first direction greater than the length of the display layer in the first direction.

In some embodiments, the upper layer group includes a cover plate layer, and the cover plate layer has a length in the first direction greater than the length of the display layer.

In some embodiments, the lower layer group includes a support layer, and the support layer has a length in the first direction greater than the length of the display layer.

In some embodiments, the flexible display panel further includes a filling layer, the filling layer is located below an extended portion of the cover plate layer relative to the display layer, and/or located above an extended portion of the support layer relative to the display layer.

In some embodiments, a sum of a thickness of the extended portion of the cover plate layer and/or a thickness of the extended portion of the support layer, and a thickness of the filling layer is the same as a thickness of a non-extending region of the flexible display panel.

In some embodiments, a range of a length difference between the at least one layer of the upper layer group and/or the at least another layer of the lower layer group and the display layer in the first direction includes a first range from 0.5 cm to 5 cm.

In some embodiments, a range of a length difference between the at least one layer of the upper layer group and/or the at least another layer of the lower layer group and the display layer in the first direction includes a second range from 1 cm to 4 cm.

In some embodiments, the at least one layer of the upper layer group comprises a plurality of layers, the at least one layer of the lower layer group comprises a plurality of layers, the plurality of layers of the upper layer group and/or the lower layer group extend in the first direction with the same length relative to the display layer.

In some embodiments, an extended portion of the upper layer group and/or the lower layer group relative to the display layer is disposed at one of ends of the display layer in the first direction.

In some embodiments, extended portions of the upper layer group and/or the lower layer group relative to the display layer are disposed at two ends of the display layer in the first direction.

In some embodiments, the flexible display panel further includes a flexible circuit board, and the flexible circuit board is connected to an end of the display layer away from an extended portion of the upper layer group and/or the lower layer group.

In some embodiments, an extended end of the flexible display panel in the first direction is configured for connecting with a terminal device.

In some embodiments, an extended end of the flexible display panel in the first direction is configured for connecting with a rotating shaft.

One of the embodiments of the present disclosure provides a display apparatus including the above-mentioned flexible display panel, and a terminal device connected with the flexible display panel.

In some embodiments, the flexible display panel performs a sliding movement relative to the terminal device.

In some embodiments, the flexible display panel performs a winding movement around a rotating shaft on the terminal device.

BRIEF DESCRIPTION OF THE DRAWINGS

The present application will be further described by way of exemplary embodiments, and the exemplary embodiments will be described in detail by reference to the accompanying drawings. These embodiments are not restrictive, and in these embodiments, the same numbers refer to the same structures, wherein.

DETAILED DESCRIPTION

Figure 1:
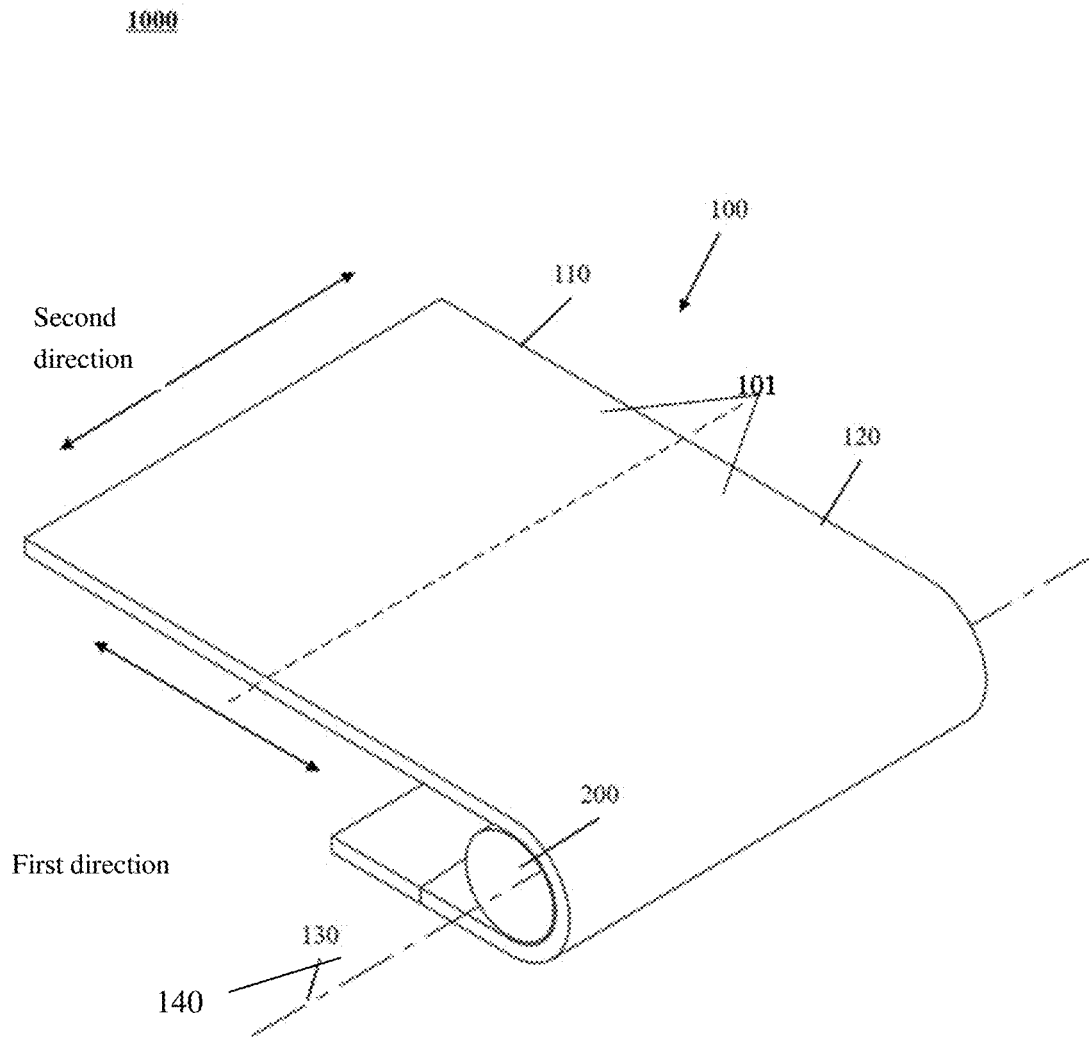
FIG. 1 is a partial structural schematic diagram of a flexible display panel in which at least one layer of an upper layer group and a lower layer group are respectively extended in a first direction according to some embodiments of the present application.

Exemplary embodiments or implementations will be described in detail herein, examples of which are illustrated in the accompanying drawings. Where the following description refers to the accompanying drawings, the same numerals in different drawings refer to the same or similar elements unless otherwise indicated. The implementations described in the exemplary embodiments below are not intended to represent all implementations consistent with the present application. Rather, they are merely examples of apparatus and methods consistent with some aspects of the present application as recited in the appended claims.

The terms used in the present application are merely for the purpose of describing particular embodiments and are not intended to limit the present application. As used in the present application and the appended claims, the singular forms "a," "the" and "said" are intended to include the plural forms as well, unless the context clearly dictates otherwise.

It should be understood that "first", "second" and similar words used in the description and claims of the present application do not indicate any order, quantity or importance, but are only used to distinguish different components. Likewise, "a" or "an" and the like do not denote a quantitative limitation, but rather denote the presence of at least one. Unless otherwise indicated, terms such as "front," "rear," "lower," and/or "upper" are for convenience of description and are not limited to one location or one spatial orientation. Words like "include" or "comprise" mean that the element or item appearing before them covers the elements or items listed after them and their equivalents, and do not exclude other elements or items.

The flexible display panel according to one or more embodiments of the present application may be applied to display apparatuses of different electronic products. The different electronic products may include, but are not limited to, various terminal devices such as mobile phones, personal computers, keyboards, monitors, televisions, vehicle display terminals, and e-books.

The flexible display panel according to some embodiments of the present application includes a display region that can display content (e.g., images) for viewing by a user. The flexible display panel includes a non-bending portion and a bending portion, and the display region is located on the non-bending portion and the bending portion. When the bending portion of the flexible display panel is bent or curved to change its shape, an area of the display region that can be observed by the user changes accordingly. In some embodiments, the flexible display panel can be used as a display screen of a sliding screen mobile phone, and the bending portion of the flexible display panel is bent through a rotating shaft and then stored on a back of the display region or directly wound on the rotating shaft; the user can choose, according to their own needs, to store the bending portion of the flexible display panel on the back of the display region or directly wind it on the rotating shaft to reduce the exposed area of the display region of the flexible display panel, so as to make the flexible display panel more portable; the user also can choose to pull out the bending portion of the flexible display panel from the back of the display region to increase the exposed area of the display region of the flexible display panel, so as to display more content.

In some embodiments, as shown in FIG. 1, the flexible display panel 100 may include a non-bending portion 110 and a bending portion 120, a display region 101 is located on the front of the non-bending portion 110 and the bending portion 120, and the bending portion 120 can be stored on the back of the non-bending portion 110 after being bent around a predetermined axis 130, wherein a surface of the flexible display panel 100 used for display can be understood as the front surface, and a surface opposite to the front surface can be understood as the back surface. In some embodiments, part or all of the bending portion 120 can be bent around the predetermined axis 130. In some embodiments, the bending portion 120 can be bent around the predetermined axis 130 with a bending angle greater than 120°. In some embodiments, the bending portion 120 can be bent around the predetermined axis 130 with a bending angle greater than 150°. In some embodiments, the bending portion 120 can be bent around the predetermined axis 130 with a bending angle greater than 170°. In some embodiments, the bending portion 120 can be bent around the predetermined axis 130 with a bending angle of approximately 180° (with an error from −5° to +5°); in some embodiments, the bending portion 120 can be bent around the predetermined axis 130 with a bending angle much greater than 180°, that is, it can be wound on a rotating shaft 200; for example, when the bending portion 120 is wound on the rotating shaft 200 for one, two, three turns, the bending angle of the bending portion 120 around the predetermined axis 130 is 360°, 720°, 1080°, . . . , wherein the predetermined axis 130 in the present embodiment may be an axis of a rotating shaft 200. In some embodiments, the bending angle of the bending portion 120 around the predetermined axis may refer to an angle of a central angle corresponding to the part of the bending portion 120 bent around the predetermined axis 130.

In some embodiments, both the non-bending portion 110 and the bending portion 120 may be used to display images. In some embodiments, in order to allow the bending portion 120 of the flexible display panel 100 to be bent in a first direction, and also allow the flexible display panel 100 to have sufficient stiffness when fully unfolded so that a display surface of the bending portion 120 can be maintained flat when the bending portion 120 displays an image without affecting the display effect of the flexible display panel, the flexible display panel 100 has different stiffness requirements in different directions.

In some embodiments, the bending portion 120 has a stiffness in the first direction lower than its stiffness in a second direction. As shown in FIG. 1, the first direction in the present application refers to a direction in which the flexible display panel is perpendicular or substantially perpendicular to the predetermined axis 130; a direction in which the flexible display panel is parallel or substantially parallel to the predetermined axis is the second direction. In some embodiments, the first direction may be a winding direction or a sliding direction of the flexible display panel 100. In some embodiments, the winding direction of the flexible display panel refers to a direction in which one end of the flexible display panel 100 that begins to be wound, moves relative to the other end. In some embodiments, the sliding direction of the flexible display panel is a direction in which one end of the flexible display panel moves when the flexible display panel is unfolded or folded. "Substantially perpendicular" or "substantially parallel" in the present application means that a small amount of error may be allowed with respect to the perpendicular or parallel direction, and the error may be within a range from −5° to +5°. In some embodiments, the error may be between −4° and +4°. In some embodiments, the error may be between −3° and +3°. In some embodiments, the error may be between −1° and +1°. For example, an angle between the first direction and a vertical line of the predetermined axis 130 may be in a range from 0° to 5°, and an angle between the second direction and a parallel line of the predetermined axis 130 may be in a range from 0° to 5°.

In some embodiments, the bending portion 120 has a stiffness between 0.01 GPa and 100 GPa in the first direction; in some embodiments, the bending portion 120 has a stiffness between 0.01 GPa and 50 GPa in the first direction; In some embodiments, the bending portion 120 has a stiffness between 0.01 GPa and 20 GPa in the first direction; in some embodiments, the bending portion 120 has a stiffness between 0.01 GPa and 10 GPa in the first direction; in some embodiments, the bending portion 120 has a stiffness between 0.01 GPa and 5 GPa in the first direction; in some embodiments, the bending portion 120 has a stiffness between 0.01 GPa and 1 GPa in the first direction. In some embodiments, the bending portion 120 has a stiffness between 10 GPa and 1000 GPa in the second direction; in some embodiments, the bending portion 120 has a stiffness between 10 GPa and 800 GPa in the second direction; in some embodiments, the bending portion 120 has a stiffness between 10 GPa and 500 GPa in the second direction; in some embodiments, the bending portion 120 has a stiffness between 10 GPa and 300 GPa in the second direction.

In some embodiments, the flexible display panel 100 may be applied to a display apparatus 1000. In some embodiments, the display apparatus 1000 may include a flexible display panel 100 and a rotating shaft 200. In some embodiments, the display apparatus 1000 may include a display screen with a variable area. In some embodiments, the display region 101 of the flexible display panel 100 that is presented in the user's field of view may serve as a display screen of the display apparatus 1000. In some embodiments, part or all of the bending portion 120 of the flexible display panel 100 can be stored in a storage region of the display apparatus 1000 (for example, the back of the non-bending portion 110) or wound on the rotating shaft 200 after being bent around the rotating shaft 200, wherein the part of the bending portion 120 wound on the rotating shaft 200 and located at the storage region is invisible to the user, and the part located outside the storage region or not wound on the rotating shaft 200 is visible to the user. In some embodiments, the display region 101 on the non-bending portion 110 and on the part of the bending portion 120 visible to the user may serve as the display screen of the display apparatus 1000. In some embodiments, the bending portion 120 of the flexible display panel 100 can be pulled out from the storage region (for example, the back of the non-bending portion 110) by a sliding movement along the first direction through the rotating shaft 200, and can be optionally presented in the user's field of vision as an extended display region 101, becoming a part of the display screen of the display apparatus 1000, and thereby increasing the area of the display screen of the display apparatus 1000. In some embodiments, the bending portion 120 can also be wound into the back of the non-bending portion 110 through the rotating shaft 200 for storage, so as to reduce the area of the display screen of the display apparatus 1000. In some embodiments, when the bending portion 120 is bent and stored on the back of the flexible display panel 100 or is wound on the rotating shaft 200, the display region 101 on this portion will not be observed by the user, and may be set into a screen-off state; when at least a part of the bending portion 120 around the rotating shaft 200 is pulled to the front of the flexible display panel 100, the part of the display region 101 that returns to the front can be turned into a screen-on state and display contents, thereby increasing the area of the display region 101 that can be seen by the user.

Figure 2:
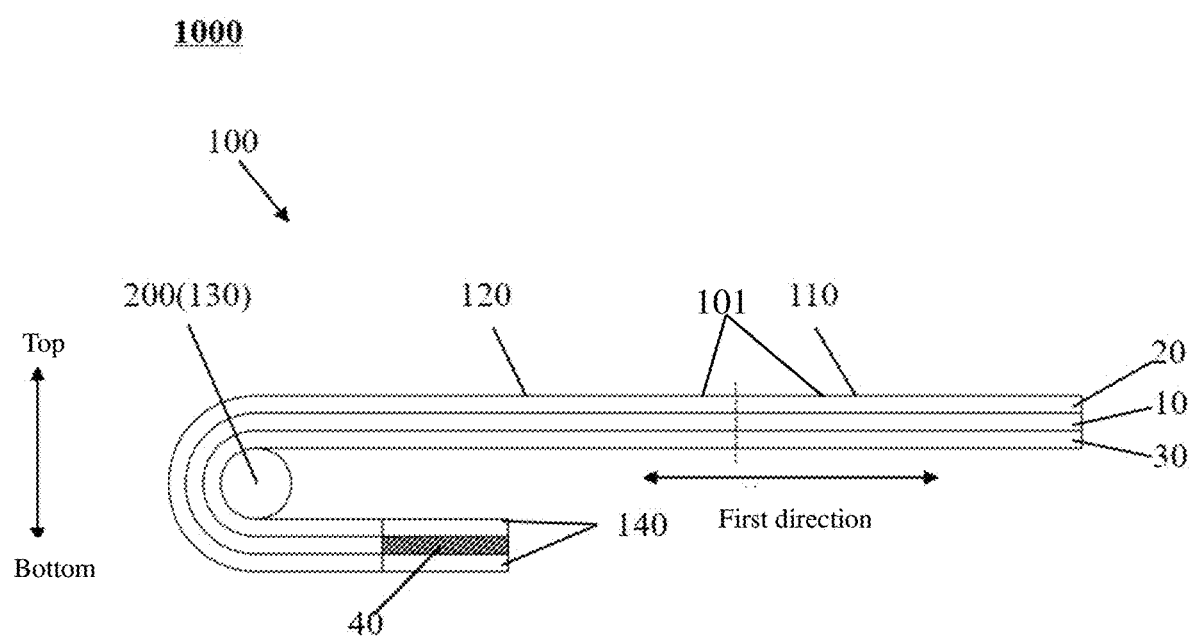
FIG. 2 is a second partial structural schematic diagram of a flexible display panel in which at least one layer of an upper layer group and a lower layer group are respectively extended in a first direction according to some embodiments of the present application.

In some embodiments, as shown in FIG. 2, the flexible display panel 100 may include a display layer 10 and a layer group. In some embodiments, the layer group may include an upper layer group 20 and a lower layer group 30, wherein the upper layer group 20 is located above the display layer 10 and the lower layer group 30 is located below the display layer 10. In some embodiments, the layer group may include merely the lower layer group 30 located below the display layer 10. The "upper" and "lower" in the present application refer to the directions of the front and back relative to the display surface of the non-bending portion 110 of the flexible display panel 100, the direction of the front of the display surface of the flexible display panel 100 is "upper", and the direction of the back of the display surface of the flexible display panel 100 is "lower".

In some embodiments, the display layer 10 may correspond to the display region 101 of the flexible display panel 100 (including the non-bending portion 110 and the bending portion 120) for displaying images. In some embodiments, the type of display device used for image display in the display layer 10 may include, but is not limited to: Organic Light Emitting Diode (OLED), Light Emitting Diode (LED), Micro Light Emitting Diode (Micro LED), Mini Light Emitting Diode (Mini LED), etc.

In some embodiments, the display layer 10 may include at least two layers. In some embodiments, the display layer 10 may include a display device layer 11 and a display driving layer 12, wherein the display driving layer 12 may be located below the display device layer 11. In some embodiments, the display device layer 11 may include an Organic Light Emitting Diode (OLED) light-emitting layer, the OLED light-emitting layer includes a plurality of pixel units arranged in an array, and the pixel units emit light so that the display device layer can display images. In some embodiments, the display driving layer 12 may be used to provide display-related control devices for the display device layer 11. In some embodiments, the display driving layer 12 may include a pixel driving circuit, and the pixel driving circuit is electrically connected to the display device layer 11 for controlling the display device layer 11 to display image. In some embodiments, the pixel driving circuit may include, but is not limited to, a TFT (Thin Film Transistor) device, a capacitor device, and the like.

Figure 3:
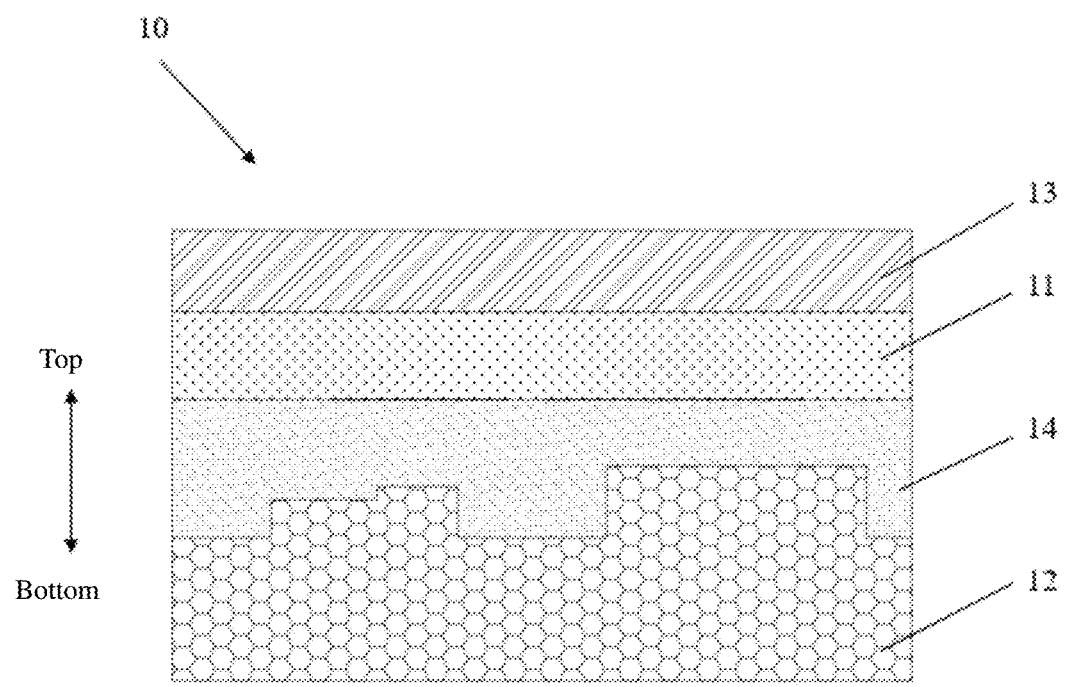
FIG. 3 is a partial structural schematic diagram of a display layer according to some embodiments of the present application.

In some embodiments, as shown in FIG. 3, the display layer 10 may further include an encapsulation layer 13, and the encapsulation layer 13 may be located above the display device layer 11. In some embodiments, since the OLED light-emitting layer in the display device layer 11 includes organic materials and the organic materials are sensitive to oxygen and water vapor and are easily eroded by oxygen and water vapor and eventually fail, the service life of the OLED light-emitting layer may be reduced. In order to improve the service life of the OLED light-emitting layer, the display device layer 11 may be encapsulated by passivation layer encapsulation technology, Atomic Layer Deposition (ALD) technology, Barix encapsulation technology, Glass Frit (FRIT) encapsulation technology, Thin-Film Encapsulation (TFE) technology, or the like, to form the encapsulation layer 13 on the display device layer 11, and the encapsulation layer 13 can block oxygen and water vapor from entering the display device layer 11, thereby avoiding the organic materials in the OLED light-emitting layer from being eroded. In some embodiments, the encapsulation layer 13 may be a thin film structure. In some embodiments, the material of the encapsulation layer 13 may include, but is not limited to, silicon nitride, polyethylene, polyacrylate, ceramic, glass frit, and the like.

In some embodiments, as shown in FIG. 3, the display layer 10 may further include a planarization layer 14, and the planarization layer 14 may be located between the display device layer 11 and the display driving layer 12. In some embodiments, since the display driving layer 12 includes a pixel driving circuit, and in order to achieve electrical connection with the display device layer 11, the display driving layer 12 includes various wirings and via holes, resulting in fluctuations on an upper surface of the display driving layer 12, and if the display device layer 11 is directly disposed on the display driving layer 12, a display surface of the display device layer 11 (i.e., a surface facing the front of the flexible display panel 100) will be uneven, affecting the display effect of the display device layer 11. Therefore, the planarization layer 14 can be disposed between the display device layer and the display driving layer 12, and a lower surface of the planarization layer 14 can be fitted with the upper surface of the display driving layer 12 (that is, the shape of the lower surface of the planarization layer 14 may match the shape of the upper surface of the display driving layer 12), while an upper surface of the planarization layer 14 may be a relatively flat plane; and when the display device layer 11 is disposed on the upper surface of the planarization layer 14, the display device layer 11 may be made to have a flat display surface to ensure its display effect. In some embodiments, the planarization layer 14 may further be provided with through holes penetrating through the planarization layer from top to bottom, so as to facilitate the electrical connection between the display driving layer 12 and the display device layer 11. In some embodiments, the planarization layer 14 may include, but is not limited to, electrical insulator materials such as silicon dioxide and silicon nitride, organic polymers (for example, acrylic, melamine-based or urethane-based polymers), or organic-inorganic hybrid composite materials, or the like.

In some embodiments, the display layer 10 may be a multi-layer structure, and in order to securely connect the layers of the display layer 10 together, an adhesive layer (not shown in the figure) may be provided between adjacent two layers of the display layer 10, which can reliably bond adjacent two layers of the display layer 10 together. In some embodiments, the adhesive layer in the display layer 10 may be an optical adhesive with high adhesiveness. In some embodiments, the adhesive layer in the display layer 10 may be Optically Clear Adhesive (OCA). In some embodiments, the adhesive layer in the display layer 10 may be an Ultraviolet Rays adhesive (UV adhesive). In some embodiments, the adhesive layer in the display layer 10 may be made of the same material as an adhesive layer 24 in the upper layer group 20 or an adhesive layer 34 in the lower layer group 30. In some embodiments, the adhesive layer in the display layer 10 may be made of different materials from the adhesive layer 24 in the upper layer group 20 or the adhesive layer 34 in the lower layer group 30, to meet different bonding strength requirements respectively corresponding to the display layer 10, the upper layer group 20 and the lower layer group 30. For the description of the adhesive layer 24 and the adhesive layer 34, please refer to FIG. 4 and FIG. 5 and their related descriptions, respectively.

Figure 4:
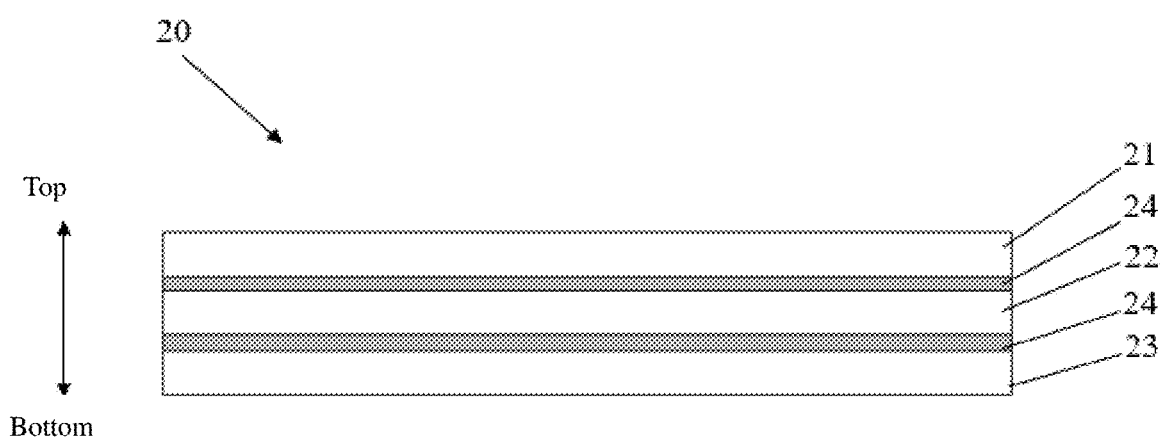
FIG. 4 is a partial structural schematic diagram of an upper layer group according to some embodiments of the present application.

In some embodiments, the upper layer group 20 may be used to protect the display layer 10, and for example, the upper layer group 20 may protect the display layer 10 from being damaged by impacts. In some embodiments, as shown in FIG. 4, the upper layer group 20 may include a cover plate layer 21, and the cover plate layer 21 may protect the display layer 10. In some embodiments, the cover plate layer 21 may be glass (for example, Ultra Thin Glass (UTG)). In some embodiments, the cover plate layer 21 may be Polymethyl Methacrylate (PMMA). In some embodiments, the cover plate layer 21 may be a clear polyimide film (CPI).

In some embodiments, the upper layer group 20 may further provide a touch function for the flexible display panel. In some embodiments, the user of the flexible display panel can operate the images displayed by the flexible display panel on the upper layer group by touching. As shown in FIG. 4, the upper layer group 20 may further include a touch layer 22. The touch layer 22 is disposed below the cover plate layer 21 for sensing the user's touch action on the cover plate layer 21. In some embodiments, the touch layer 22 may be a Polyethylene Terephthalate (PET) film, an Indium Tin Oxide (ITO) film, or the like. In some embodiments, the touch layer 22 may include touch sensors for detecting touch actions. In some embodiments, touch sensors may include, but are not limited to, infrared sensors, resistive sensors, surface acoustic wave sensors, capacitive sensors, and the like. In some embodiments, the cover plate layer 21 can protect the touch layer 22 to prevent the touch layer 22 from being damaged by impacts. In some embodiments, the touch layer 22 can be directly embedded in the display layer 10 to reduce the thickness of the flexible display panel 100 while realizing the touch function.

In some embodiments, the upper layer group 20 can further absorb reflected lights from metal electrodes in the flexible display panel (for example, metal electrodes in the touch layer, metal electrodes in the display device layer) to external lights, thereby reducing the interference of the external lights, increasing the contrast of the displayed image, and thus the user of the flexible device can clearly see the displayed images. In some embodiments, the upper layer group 20 may further include an optical layer 23. In some embodiments, the optical layer 23 may include a circular polarizer or a linear polarizer for absorbing or refracting the reflected lights, so as to reduce the interference of the reflected lights to the display device layer 11 for image display. In some embodiments, the material of the polarizer may include, but is not limited to, Triacetyl Cellulose (TAC), Polyethylene Terephthalate (PET), Cyclo Olefin Polymer (COP), Polymethyl Methacrylate (PMMA), and so on. In some embodiments, the optical layer may be located between the touch layer 22 and the display layer 10.

In some embodiments, the upper layer group 20 may include at least one layer. In some embodiments, the upper layer group 20 may include merely a cover plate layer 21. In some embodiments, the upper layer group 20 may include a cover plate layer and an optical layer. In some embodiments, the upper layer group 20 may include all of a cover plate layer 21, a touch layer 22 and an optical layer 23. In some embodiments, as shown in FIG. 4, in order to securely connect adjacent two layers in the upper layer group 20, the upper layer group 20 may further include an adhesive layer 24 disposed between adjacent two layers in the upper layer group 20, the cover plate layer 21 and the touch layer 22, and the touch layer 22 and the optical layer 23 can be reliably bonded together by the adhesive layer 24. In some embodiments, the adhesive layer 24 may be an optical adhesive with high adhesiveness. In some embodiments, the adhesive layer 24 may be Optically Clear Adhesive (OCA). In some embodiments, the adhesive layer 24 may be Ultraviolet Rays adhesive (UV adhesive).

Figure 5:
FIG. 5 is a partial structural schematic diagram of a lower layer group according to some embodiments of the present application.

In some embodiments, the lower layer group 30 may be used to support the upper layer group 20 and the display layer 10. In some embodiments, as shown in FIG. 5, the lower layer group 30 may include a support layer 31 disposed below the display layer 10 (the display driving layer 14) for supporting the display layer 10 and the upper layer group 20. In some embodiments, the material of the support layer 31 may include, but is not limited to, Polyimide (PI) material, Polyethylene Terephthalate (PET) material, Polybenzimidazole (PBI) material, Polyetheretherketone (PEEK) material, Polyvinylidene fluoride (PVDF) material, Polyphenylenesulphide (PPS) material, and any combination of the above materials. In some embodiments, the support layer 31 may be a glass material with bending properties, and it is only necessary to ensure that the thickness of the glass meets the bending requirements. In some embodiments, in several composite materials of the support layer 31, the mass ratio of polyimide is 50%-100%; in some embodiments, in several composite materials of the support layer 31, the mass ratio of polyimide is 60%-90%. In some embodiments, the mass ratio of PET is 0-20%; in some embodiments, the mass ratio of PET is 0-10%; in some embodiments, the mass ratio of PET is 0-4%. In some embodiments, the mass ratio of PBI is 0-30%; in some embodiments, the mass ratio of PBI is 5-20%; in some embodiments, the mass ratio of PEEK is 0-4%. In some embodiments, the mass ratio of PVDF is 0-10%; in some embodiments, the mass ratio of PVDF is 0-5%. In some embodiments, the mass ratio of PPS is 0-10%; in some embodiments, the mass ratio of PPS is 0-5%.

In some embodiments, in order to avoid impurities (for example, some conductive impurities) in the support layer 31 of the lower layer group 30 from affecting the performance of the display driving layer 12 (for example, TFT device) in the display layer 10, the lower layer group 30 may further include an isolation layer (not shown in the figure) disposed between the support layer 31 and the display driving layer 12 for isolating the support layer 31 from the display driving layer 12. In some embodiments, the material of the isolation layer may be an insulating material. In some embodiments, the material of the isolation layer may be silicon oxide film, polypropylene film, polyester film, polystyrene film, and the like. In some embodiments, a surface of the support layer 31 in contact with the display driving layer 12 may be coated with insulating paints, insulating adhesives, or the like to replace the isolation layer.

In some embodiments, when the flexible display panel 100 is in an unfolded state, the bending portion 120 and the non-bending portion 110 of the flexible display panel 100 perform image display in combination, however, due to the lower stiffness of the bending portion 120, the bending portion 120 may deform when performing the image display due to the action of stress (for example, gravity of the bending portion itself), resulting in that the surface for displaying images is relatively uneven or deflects relative to the display surface of the non-bending portion 110, which affects the display effect of the flexible display panel 100. Therefore, the lower layer group 30 can further provide a certain rigid support when the flexible display panel 100 is unfolded, so as to keep the surface of the flexible display panel 100 flat. As shown in FIG. 5, the lower layer group may further include a reinforcement support layer 32. The reinforcement support layer 32 may be disposed below the support layer 31, and has sufficient rigidity to support the display layer 10 and the upper layer group 20, thereby improving the rigidity of the flexible display panel 100. In some embodiments, the material of the reinforcement support layer 32 may include a rigid material. In some embodiments, the rigid material used for the reinforcement support layer 32 may be a material with a relatively high Young's modulus. In some embodiments, the rigid material used for the reinforcement support layer 32 may have a Young's modulus ranging from 40 Gpa to 100 Gpa. In some embodiments, the rigid material used for the reinforcement support layer 32 may have a Young's modulus ranging from 50 Gpa to 100 Gpa. In some embodiments, the rigid material used for the reinforcement support layer 32 may have a Young's modulus ranging from 40 Gpa to 70 Gpa. In some embodiments, the material of the reinforcement support layer 32 may include, but is not limited to, steel, titanium alloy, aluminum alloy, glass, carbon fiber, glass fiber and other materials with certain rigidity. In some embodiments, the reinforcement support layer 32 may be provided with a certain number of pattern holes, and the pattern holes may be used to adjust the rigidity of the reinforcement support layer 32. If the rigid material selected for the reinforcement support layer 32 has a too high rigidity, resulting in that the reinforcement support layer 32 cannot be bent when the flexible display panel 100 is bent, in this case, a certain number of pattern holes can be provided on the reinforcement support layer 32, and the more the pattern holes there are, the smaller the rigidity of the reinforcement support layer 32 is. In some embodiments, the shapes of the pattern holes may include, but are not limited to, regular or irregular shapes such as circles, triangles, diamonds, squares, and the like. In some embodiments, the reinforcement support layer 32 may be replaced by a reinforcement rib, which is implemented to provide a certain rigid support for the flexible display panel 100 when it is unfolded.

In some embodiments, as shown in FIG. 5, the lower layer group 30 may further include a buffer layer 33. In some embodiments, the buffer layer may be used for buffering when the flexible display panel 100 is impacted. In some embodiments, the buffer layer 33 may be disposed below the support layer 31, and between the support layer 31 and the reinforcement support layer 32. In some embodiments, the material of the buffer layer 33 may include, but is not limited to, foam material, such as Polyurethane (PU) foam, silicon foam, and acrylic foam.

In some embodiments, the lower layer group 30 may include at least one layer. In some embodiments, the lower layer group 30 may include merely a support layer 31. In some embodiments, the lower layer group 30 may include a support layer 31 and a reinforcement support layer 32. In some embodiments, the lower layer group 30 may include a support layer 31, a buffer layer 33 and a reinforcement support layer 32. In some embodiments, in order to securely connect the respective layers in the lower layer group 30, the lower layer group 30 may further include an adhesive layer 34 disposed between adjacent two layers, by which the support layer 31 and the buffer layer 33, the buffer layer 33 and the reinforcement support layer 32 can be reliably bonded together. In some embodiments, the adhesive layer 34 may be an optical adhesive with high adhesiveness. In some embodiments, the adhesive layer 34 may be Optically Clear Adhesive (OCA). In some embodiments, the adhesive layer 34 may be an Ultraviolet Rays adhesive (UV adhesive). In some embodiments, the adhesive layer 34 in the lower layer group 30 may be made of the same material as the adhesive layer 24 in the upper layer group 20. In some embodiments, the adhesive layer 34 in the lower layer group 30 may be made of different materials from the adhesive layer 24 in the upper layer group 20, to satisfy the adhesion strength requirements between the various layers in the upper layer group 20 and that in the lower layer group 30.

In some embodiments, the flexible display panel 100 can be folded or unfolded through a winding movement or a sliding movement. In some embodiments, the bending portion 120 of the flexible display panel 100 can be connected to the rotating shaft 200, and when the flexible display panel 100 does not need to display, the rotating shaft 200 can drive the bending portion 120 to perform a winding movement around the rotating shaft 200, so that part or all of the bending portion 120 are gradually wound on the rotating shaft 200; at this time, part or all of the bending portion 120 is stored on the rotating shaft 200 and will not be observed by the user, and the display region 101 on the bending portion that will not be observed by the user, may not display images; when the flexible display panel 100 needs to be unfolded, the rotating shaft 200 can rotate to unfold part or all of the bending portion 120 around the rotating shaft 200, part or all of the bending portion 120 is presented in the user's field of vision, and the display region 101 on the bending portion 120 presented in the user's field of view may serve as an extended display region and present images to the user in combination with the display region (a main display region) on the non-bending portion 110. In some embodiments, the bending portion 120 of the flexible display panel can be connected with a movement mechanism of a terminal device, and the movement mechanism can drive the bending portion 120 to perform a sliding movement; when the flexible display panel 100 is unfolded, part or all of the bending portion 120 can exit from the back of the non-bending portion 110 (that is, the storage region) through the rotating shaft 200 by means of the sliding movement in the first direction, and move to the front of the flexible display panel 100 to be presented in the user's field of vision, and at this time, part or all of the display region 101 on the bending portion 12 can serve as an extended display region and present images to the user in combination with the display region on the non-bending portion 110; and when the flexible display panel 100 is folded, part or all of the bending portion 120 can enter the back of the non-bending portion 110 (that is, the storage region) through the rotating shaft 200 by the sliding movement in the first direction, the bending portion 120 located in the storage region will not be presented in the user's field of vision, and the display region 101 on the bending portion 120 located in the storage region may not display images. In some embodiments, at least a part of the bending portion 120 of the flexible display panel 100 needs to connect with the rotating shaft 200 or the movement mechanism to realize the winding movement or sliding movement of the flexible display panel 100.

In some embodiments, in order that the display region 101 on the bending portion 120 and the non-bending portion 110 can present images to the user with the largest possible area, ensuring that the display layer of the flexible display panel 100 is located on the front of the flexible display panel 100 as much as possible to provide image display when the flexible display panel 100 is fully unfolded, an extension portion 140 may be provided on at least one end of the flexible display panel 100 in the first direction for connecting with the rotating shaft 200 or the movement mechanism. In some embodiments, the extension portion 140 may include additional lengths of the upper layer group 20 and/or the lower layer group 30 respectively relative to the display layer 10 in the first direction, so that the bending portion 120 of the flexible display panel 100 including the display layer 10 is not directly connected with the rotating shaft 200 or the movement mechanism, while a non-display layer portion disposed at one end of the flexible display panel 100 in the first direction is connected with the rotating shaft 200 or the movement mechanism; as a result, when the flexible display panel 100 is fully unfolded, the display layer 10 in the bending portion 120 is located on the front of the flexible display panel 100 as much as possible, and the display region 101 on the bending portion 120 can serve as an extended display region and present images to the user in combination with the main display region on the non-bending portion 110, so that the display region 101 of the flexible display panel 100 can present images to the user with the largest possible area.

In some embodiments, at least one layer of the upper layer group 20 and/or the lower layer group 30 may be extended in the first direction, such that the at least one layer of the upper layer group 20 and/or the lower layer group 30 has a length in the first direction greater than that of the display layer 10 in the first direction. The extended portion of the at least one layer of the upper layer group 20 and/or the lower layer group 30 relative to the display layer 10 in the first direction can be used as the extension portion 140 at one end of the flexible display panel 100 for connecting with the rotating shaft 200 or the movement mechanism.

In some embodiments, the cover plate layer 21 in the upper layer group 20 has a length in the first direction greater than that of the display layer 10 in the first direction. In some embodiments, the adhesive layer 24 in the upper layer group 20 has a length in the first direction greater than that of the display layer 10 in the first direction. In some embodiments, the touch layer 22 in the upper layer group 20 has a length in the first direction greater than that of the display layer 10 in the first direction. In some embodiments, the optical layer 23 in the upper layer group 20 has a length in the first direction greater than that of the display layer 10 in the first direction. In some embodiments, there may be multiple layers in the upper layer group 20 each of which has a length in the first direction greater than that of the display layer 10 in the first direction. In some embodiments, the cover plate layer 21 and the adhesive layer 24 in the upper layer group 20 each has a length in the first direction greater than that of the display layer 10 in the first direction. In some embodiments, the cover plate layer 21, the adhesive layer 24 and the optical layer 23 in the upper layer group 20 each has a length in the first direction greater than that of the display layer 10 in the first direction.

In some embodiments, the support layer 31 in the lower layer group 30 has a length in the first direction greater than that of the display layer 10 in the first direction. In some embodiments, the reinforcement support layer 32 in the lower layer group 30 has a length in the first direction greater than that of the display layer 10 in the first direction. In some embodiments, the buffer layer 33 in the lower layer group 30 has a length in the first direction greater than that of the display layer 10 in the first direction. In some embodiments, the adhesive layer 34 in the lower layer group 30 has a length in the first direction greater than that of the display layer 10 in the first direction. In some embodiments, the isolation layer in the lower layer group 30 has a length in the first direction greater than that of the display layer 10 in the first direction. In some embodiments, there may be multiple layers in the lower layer group 30 each of which has a length in the first direction greater than that of the display layer 10 in the first direction. In some embodiments, the support layer 31, the reinforcement support layer 32 and the adhesive layer 34 in the lower layer group 30 each has a length in the first direction greater than that of the display layer 10 in the first direction. In some embodiments, the support layer 31 and the reinforcement support layer 32 in the lower layer group 30 each has a length in the first direction greater than that of the display layer 10 in the first direction. In some embodiments, the support layer 31, the reinforcement support layer 32, the buffer layer 33 and the adhesive layer 34 in the lower layer group 30 each has a length in the first direction greater than that of the display layer 10 in the first direction. In some embodiments, the support layer 31, the reinforcement support layer 32, the buffer layer 33, the adhesive layer 34 and the isolation layer in the lower layer group 30 each has a length in the first direction greater than that of the display layer 10 in the first direction.

Figure 6:
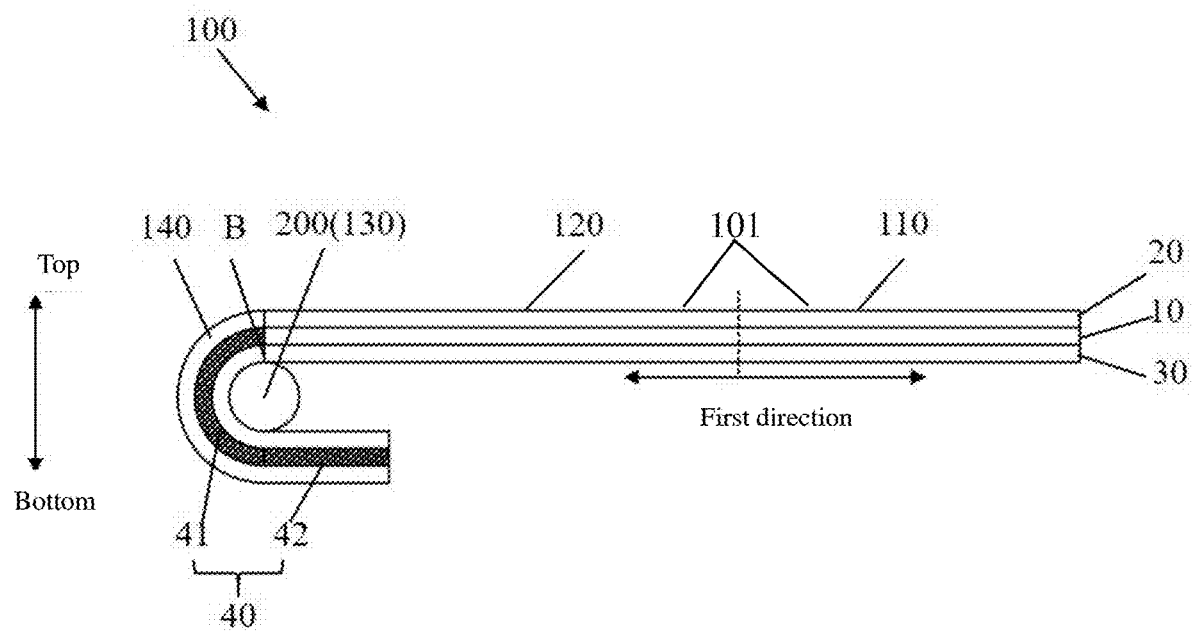
FIG. 6 is a third partial structural schematic diagram of a flexible display panel in which at least one layer of an upper layer group and a lower layer group are respectively extended in a first direction according to some embodiments of the present application.

The length difference between the at least one layer of the upper layer group 20 and/or the lower layer group 30 and the display layer 10 in the first direction needs to be carefully selected in combination with applications and properties of materials; it will not only waste materials, but also occupy additional space if the length difference is too large, while necessary functions cannot be achieved if the length difference is too small In some embodiments, a range of the length difference between the at least one layer of the upper layer group 20 and/or the lower layer group 30 and the display layer 10 in the first direction comprise a first range from 0.5 cm and 5 cm. In some embodiments, a range of the length difference between at least one layer of the upper layer group and/or the lower layer group and the display layer in the first direction comprises a second range from 1 cm to 4 cm. In some embodiments, the length difference between the at least one layer of the upper layer group 20 and/or the lower layer group 30 and the display layer 10 in the first direction is between 0.5 cm and 3 cm. In some embodiments, the length difference between the at least one layer of the upper layer group 20 and/or the lower layer group 30 and the display layer 10 in the first direction is between 1 cm and 2 cm. In some embodiments, the length difference between the at least one layer of the upper layer group 20 and/or the lower layer group 30 and the display layer 10 in the first direction is between 1.2 cm and 1.6 cm. In some embodiments, the length difference between the at least one layer of the upper layer group 20 and/or the lower layer group 30 and the display layer 10 in the first direction is the length of the at least one layer of the upper layer group 20 and/or the lower layer group 30 extended in the first direction, and also is the length of the extension portion 140 at one end of the flexible display panel 100 in the first direction. In some embodiments, the length of the at least one layer of the upper layer group 20 and/or the lower layer group 30 extended in the first direction may be related to the material properties of the layer itself; for example, if the material of the layer has higher tensile strength, the length of the layer extended in the first direction can be smaller, that is, the extension portion 140 at one end of the flexible display panel 100 in the first direction can have a relatively high connection strength with the rotating shaft 200 or the movement mechanism with a relatively short length. In some embodiments, the length of the at least one layer of the upper layer group 20 and/or the lower layer group 30 extended in the first direction may be related to the connection manner in which the extension portion 140 at one end of the flexible display panel 100 in the first direction is connected with the rotating shaft or the movement mechanism; for example, the extension portion 140 at one end of the flexible display panel 100 in the first direction may be connected with the rotating shaft 200 or the movement mechanism by bonding, and if the adopted adhesive has a higher adhesive strength, the length of the at least one layer of the upper layer group 20 and/or the lower layer group 30 extended in the first direction can be shorter, while still sufficient to ensure the connection strength between the extension portion 140 and the rotating shaft 200 or the movement mechanism. In some embodiments, the length of the at least one layer of the upper layer group 20 and/or the lower layer group 30 extended in the first direction may be related to the radius of the rotating shaft 200; as shown in FIG. 6, the flexible display panel 100 is in a fully unfolded state, and in order to enable the display region 101 of the flexible display panel 100 to present images to the user with the largest possible area, the display layer 10 in the flexible display panel 100 can be completely located on the front of the flexible display panel 100 to fully display images; for example, when the flexible display panel 100 is fully unfolded by the sliding movement in the first direction, the entire display region 101 on the bending portion 120 is located on the front of the flexible display panel 100, and at this time, the bending portion 120 does not have a part bent around the rotating shaft 200, while the extension portion 140 at one end of the flexible display panel 100 in the first direction is bent around the rotating shaft 200, wherein the larger the radius of the rotating shaft 200 is, the longer the length of the extension portion 140 in the first direction is, and the longer the length of the at least one layer of the upper layer group 20 and/or the lower layer group 30 extended in the first direction may be. In some embodiments, the length of the at least one layer of the upper layer group 20 and/or the lower layer group 30 extended in the first direction may be greater than or equal to ⅓ of a radial perimeter of the rotating shaft 200.

Figure 7:
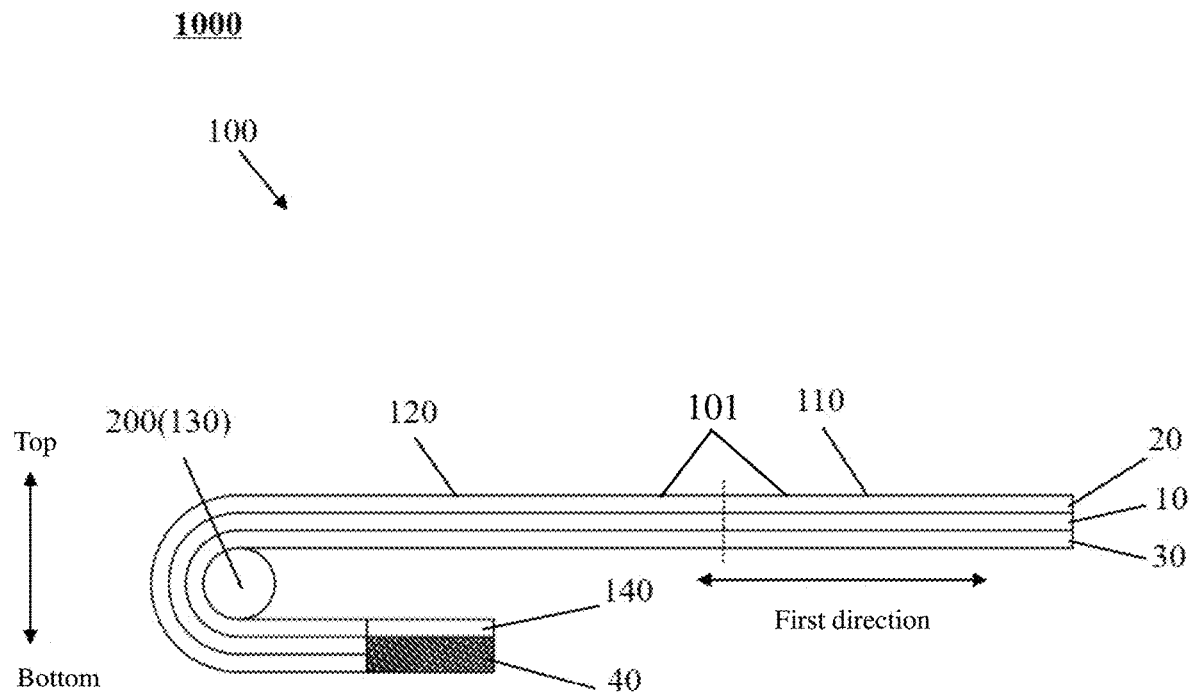
FIG. 7 is a partial structural schematic diagram of a flexible display panel in which only at least one layer of an upper layer group is extended in a first direction according to some embodiments of the present application.

In some embodiments, as shown in FIG. 7, only at least one layer in the upper layer group 20 may be extended in the first direction as the extension portion 140 at one end of the flexible display panel 100. In some embodiments, only one layer of the upper layer group may be extended in the first direction. In some embodiments, only the cover plate layer 21 in the upper layer group 20 may be extended in the first direction, so that the length of the cover plate layer 21 in the first direction is greater than the length of the display layer 10 in the first direction. In some embodiments, only the touch layer 22 in the upper layer group 20 may be extended in the first direction, so that the length of the touch layer 22 in the first direction is greater than the length of the display layer 10 in the first direction. In some embodiments, only the optical layer 23 in the upper layer group 20 may be extended in the first direction, so that the length of the optical layer 23 in the first direction is greater than the length of the display layer 10 in the first direction. In some embodiments, only the adhesive layer 24 in the upper layer group 20 may be extended in the first direction, so that the length of the adhesive layer in the first direction is greater than the length of the display layer 10 in the first direction. In some embodiments, a plurality of layers in the upper layer group 20 may be extended in the first direction, so that the respective lengths of the plurality of layers in the upper layer group 20 in the first direction are greater than the length of the display layer 10 in the first direction. In some embodiments, the cover plate layer 21 and the adhesive layer 24 in the upper layer group 20 may be respectively extended in the first direction, so that the respective lengths of the cover plate layer 21 and the adhesive layer in the first direction are greater than that of the display layer 10 in the first direction. In some embodiments, the cover plate layer 21, the adhesive layer and the optical layer 23 in the upper layer group 20 can be respectively extended in the first direction, so that the respective lengths of the cover plate layer 21, the adhesive layer and the optical layer 23 in the first direction are greater than the length of the display layer 10 in the first direction. In some embodiments, the plurality of layers in the upper layer group 20 are extended in the first direction with the same length relative to the display layer 10. In some embodiments, the plurality of layers in the upper layer group 20 are extended in the first direction with not exactly the same or completely different lengths relative to the display layer 10. In some embodiments, in case that the cover plate layer 21, the touch layer 22, the optical layer 23 and/or the adhesive layer 24 are respectively extended in the first direction, the length of the cover plate layer 21 extended in the first direction relative to the display layer 10 may be greater than the respective lengths of the touch layer 22 and the optical layer 23 extended in the first direction, so that the length of the cover plate layer 21 in the first direction is greater than the respective lengths of the touch layer 22 and the optical layer 23 in the first direction, and thus the cover plate layer 21 can sufficiently protect the touch layer 22 and the optical layer 23. In some embodiments, the difference between the length of the cover plate layer 21 in the first direction and that of the touch layer 22 and the optical layer 23 in the first direction is in a range from 0 mm to 2 mm. In some embodiments, the difference between the length of the cover plate layer 21 in the first direction and that of the touch layer 22 and the optical layer 23 in the first direction is in a range from 0 mm to 1 mm. In some embodiments, the difference between the length of the cover plate layer 21 in the first direction and that of the touch layer 22 and the optical layer 23 in the first direction is in a range from 0 mm to 0.5 mm.

Figure 8:
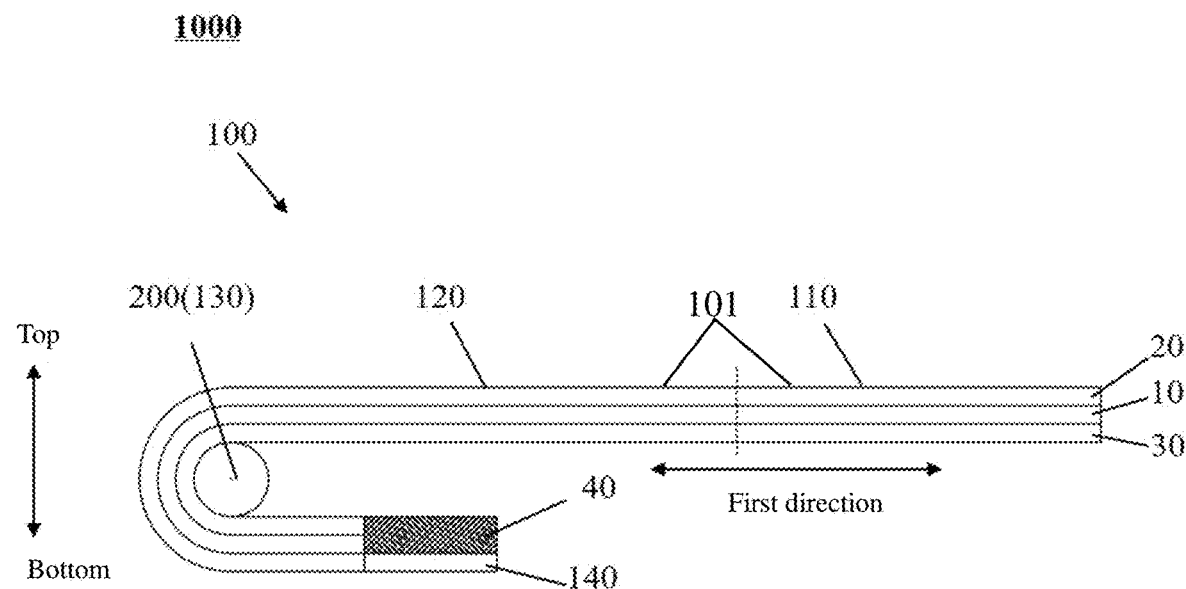
FIG. 8 is a partial structural schematic diagram of a flexible display panel in which only at least one layer of a lower layer group is extended in a first direction according to some embodiments of the present application.

In some embodiments, as shown in FIG. 8, only at least one layer in the lower layer group 30 may be extended in the first direction as the extension portion 140 at one end of the flexible display panel 100. In some embodiments, only one layer of the lower layer group 30 may be extended in the first direction. In some embodiments, only the support layer 31 in the lower layer group 30 may be extended in the first direction, so that the length of the support layer 31 in the first direction is greater than the length of the display layer 10 in the first direction. In some embodiments, only the reinforcement support layer 32 in the lower layer group 30 may be extended in the first direction, so that the length of the reinforcement support layer 32 in the first direction is greater than the length of the display layer 10 in the first direction. In some embodiments, only the buffer layer 33 in the lower layer group 30 may be extended in the first direction, so that the length of the buffer layer in the first direction is greater than the length of the display layer 10 in the first direction. In some embodiments, only the adhesive layer 34 in the lower layer group 30 may be extended in the first direction, so that the length of the adhesive layer 34 in the first direction is greater than the length of the display layer 10 in the first direction. In some embodiments, only the isolation layer in the lower layer group 30 may be extended in the first direction, so that the length of the isolation layer in the first direction is greater than the length of the display layer 10 in the first direction. In some embodiments, a plurality of layers in the lower layer group 30 may be respectively extended in the first direction, so that the respective lengths of the plurality of layers in the lower layer group 30 in the first direction are greater than the length of the display layer 10 in the first direction. In some embodiments, the support layer 31, the reinforcement support layer 32, the buffer layer 33 and the adhesive layer 34 in the lower layer group may be respectively extended in the first direction, so that the respective lengths of the support layer 31, the reinforcement support layer 32, the buffer layer 33 and the adhesive layer 34 in the first direction are all greater than the length of the display layer 10 in the first direction. In some embodiments, the support layer 31, the reinforcement support layer 32, the buffer layer 33, the adhesive layer 34 and the isolation layer in the lower layer group 30 may be respectively extended in the first direction, so that the respective lengths of the support layer 31, the reinforcement support layer 32, the buffer layer 33, the adhesive layer 34 and the isolation layer in the first direction are all greater than the length of the display layer 10 in the first direction. In some embodiments, the plurality of layers in the lower layer group 30 may be extended in the first direction with the same length relative to the display layer 10, such that the plurality of layers in the lower layer group 30 have the same length in the first direction. In some embodiments, the plurality of layers in the lower layer group 30 are extended in the first direction with not exactly the same or completely different lengths relative to the display layer 10, so that the plurality of layers in the lower layer group 30 have not exactly the same or completely different lengths in the first direction.

In some embodiments, as shown in FIG. 2, at least one layer in the upper layer group 20 and at least one layer in the lower layer group 30 may be both extended in the first direction to jointly serve as the extension portion 140 at one end of the flexible display panel 100. In some embodiments, one layer in the upper layer group 20 and one layer in the lower layer group 30 may be simultaneously extended in the first direction. In some embodiments, the cover plate layer 21 in the upper layer group 20 and the support layer 31 in the lower layer group 30 may be simultaneously extended in the first direction, so that the respective lengths of the cover plate layer 21 in the upper layer group 20 and the support layer 31 in the lower layer group 30 in the first direction are greater than the length of the display layer 10 in the first direction. In some embodiments, the lengths of the cover plate layer 21 and the support layer 31 in the first direction may be the same or different. In some embodiments, the cover plate layer 21 in the upper layer group 20 and the reinforcement support layer 32 in the lower layer group 30 can be respectively extended in the first direction, so that the respective lengths of the cover plate layer 21 in the upper layer group 20 and the reinforcement support layer 32 in the lower layer group 30 in the first direction are greater than the length of the display layer 10 in the first direction. In some embodiments, the lengths of the cover plate layer 21 and the reinforcement support layer 32 in the first direction may be the same or different. In some embodiments, a plurality of layers in the upper layer group 20 and one layer in the lower layer group 30 may be respectively extended in the first direction, so that the respective lengths of the plurality of layers in the upper layer group 20 and the one layer in the lower layer group 30 in the first direction are greater than that of the display layer 10 in the first direction. In some embodiments, the cover plate layer 21, the adhesive layer 24 in the upper layer group 20, and the support layer 31 in the lower layer group 30 may be respectively extended in the first direction, so that the respective lengths of the cover plate layer 21, the adhesive layer 24 in the upper layer group 20, and the support layer 31 in the lower layer group 30 in the first direction are greater than the length of the display layer 10 in the first direction. In some embodiments, the cover plate layer 21, the optical layer 23, the adhesive layer 24 in the upper layer group 20 and the support layer 31 in the lower layer group 30 may be respectively extended in the first direction, so that the respective lengths of the cover plate layer 21, the optical layer 23, the adhesive layer 24 in the upper layer group 20 and the support layer 31 in the lower layer group 30 in the first direction are greater than the length of the display layer 10 in the first direction. In some embodiments, the lengths of the plurality of layers in the upper layer group 20 and the one layer in the lower layer group 30 in the first direction may be the same, not exactly the same or completely different. In some embodiments, the plurality of layers in the upper layer group 20 have the same length in the first direction but have different lengths in the first direction from the length of the one layer in the lower layer group 30 in the first direction. In some embodiments, one layer in the upper layer group 20 and a plurality of layers in the lower layer group 30 may be respectively extended in the first direction. In some embodiments, the cover plate layer 21 in the upper layer group 20 and the support layer 31, the reinforcement support layer 32, and the adhesive layer 34 in the lower layer group 30 may be respectively extended in the first direction, so that the respective lengths of the cover plate layer 21 in the upper layer group 20 and the support layer 31, the reinforcement support layer 32, and the adhesive layer 34 in the lower layer group 30 in the first direction are greater than the length of the display layer 10 in the first direction. In some embodiments, the cover plate layer 21 in the upper layer group 20 and the support layer 31, the reinforcement support layer 32, the buffer layer 33, the adhesive layer 34 and the isolation layer in the lower layer group 30 can be respectively extended in the first direction, so that the respective lengths of the cover plate layer 21 in the upper layer group 20 and the support layer 31, the reinforcement support layer 32, the buffer layer 33, the adhesive layer 34 and the isolation layer in the lower layer group 30 in the first direction are greater than the length of the display layer 10 in the first direction. In some embodiments, the one layer of the upper layer group 20 and the plurality of layers in the lower layer group 30 may have the same, not exactly the same, or completely different lengths in the first direction. In some embodiments, the plurality of layers in the lower layer group 30 have the same length in the first direction but have different length in the first direction from the one layer in the upper layer group 20. In some embodiments, a plurality of layers in the upper layer group 20 and a plurality of layers in the lower layer group 30 may be respectively extended in the first direction, and in some embodiments, the cover plate layer 21, the optical layer 23, and the adhesive layer 24 in the upper layer group 30 and the support layer 31, the reinforcement support layer 32, the buffer layer 33, and the adhesive layer 34 in the lower layer group 30 may be respectively extended in the first direction, so that the respective lengths of the cover plate layer 21, the optical layer 23 and the adhesive layer 24 in the upper layer group 20, and the support layer 31, the reinforcement support layer 32, the buffer layer 33 and the adhesive layer in the lower layer group 30 in the first direction are greater than the length of the display layer 10 in the first direction. In some embodiments, the lengths of the plurality of layers in the upper layer group 20 and the plurality of layers in the lower layer group 30 extended in the first direction relative to the display layer 10 may be the same, not exactly the same, or completely different. In some embodiments, the plurality of layers in the upper layer group 20 have the same length in the first direction, the plurality of layers in the lower layer group 30 have the same length in the first direction, and the plurality of layers in the upper layer group 20 have a length in the first direction different from that of the plurality of layers in the lower layer group in the first direction.

In some embodiments, the extended portion of at least one layer of the upper layer group 20 and/or the lower layer group 30 relative to the display layer 10 in the first direction may be integrally formed with its corresponding layer, and have the same material and thickness as its corresponding layer. In some embodiments, the extended portion of the at least one layer of the upper layer group 20 and/or the lower layer group 30 relative to the display layer 10 in the first direction may be the extended (or additional) length of the at least one layer of the upper layer group 20 and/or the lower layer group 30 relative to the display layer 10 in the first direction. In some embodiments, the extended portion of the at least one layer of the upper layer group 20 and/or the lower layer group 30 relative to the display layer 10 in the first direction may be provided separately from its corresponding layer, so that the extended portion and its corresponding layer have the same or different materials and/or thicknesses.

In some embodiments, after extending at least one layer of the upper layer group 20 and/or the lower layer group 30 in the first direction, the flexible display panel 100 may include a non-extending region (including the bending portion 120 and the non-bending portion 110) with the display layer 10 and the extension portion 140 provided on at least one end of the flexible display panel 100 in the first direction, wherein the extension portion 140 at one end of the flexible display panel 100 in the first direction does not include a display layer, and a thickness of the non-extending region of the flexible display panel 100 is different from that of the extension portion 140, and thus the flexible display panel 100 has an inconsistent thickness in the first direction. In some embodiments, in order to compensate for the thickness difference between the extended portion 140 and the non-extending region, the flexible display panel may further include a filling layer 40.

As shown in FIG. 7, when only at least one layer in the upper layer group 20 is extended in the first direction, the filling layer 40 may be located below the extended portion of the at least one layer in the upper layer group 20 relative to the display layer 10 in the first direction. In some embodiments, when only the cover plate layer 21 is extended in the first direction, the filling layer 40 may be located below the extended portion of the cover plate layer 21 relative to the display layer 10 in the first direction. In some embodiments, the sum of the thickness of the extended portion of the cover plate layer 21 relative to the display layer 10 in the first direction and the thickness of the filling layer 40 may be the same or substantially the same as the thickness of the non-extending region of the flexible display panel 100 (the sum of the thicknesses of the upper layer group 20, the display layer 10 and the lower layer group 30). In some embodiments, the sum of the thickness of the extended portion of the cover plate layer 21 relative to the display layer 10 in the first direction and the thickness of the filling layer 40 being substantially the same as the thickness of the non-extending region of the flexible display panel 100, means that there is a certain difference between the sum of the thickness of the extended portion of the cover plate layer 21 relative to the display layer 10 in the first direction and the thickness of the filling layer 40, and the thickness of the non-extending region of the flexible display panel 100. In some embodiments, the difference between the sum of the thickness of the extended portion of the cover plate layer 21 relative to the display layer 10 in the first direction and the thickness of the filling layer 40, and the thickness of the non-extending region of the flexible display panel 100 falls within a range from 0 to 3 mm. In some embodiments, the difference between the sum of the thickness of the extended portion of the cover plate layer 21 relative to the display layer 10 in the first direction and the thickness of the filling layer 40, and the thickness of the non-extending region of the flexible display panel 100 falls within a range from 0 to 2 mm In some embodiments, the difference between the sum of the thickness of the extended portion of the cover plate layer 21 relative to the display layer 10 in the first direction and the thickness of the filling layer 40, and the thickness of the non-extending region of the flexible display panel 100 falls within a range from 0 to 1 mm.

As shown in FIG. 8, when only at least one layer in the lower layer group 30 is extended in the first direction, the filling layer 40 may be located a top of the extended portion of the at least one layer in the lower layer group 30 relative to the display layer 10 in the first direction. In some embodiments, when only the support layer 31 is extended in the first direction, the filling layer 40 may be located on a top of the support layer 31. In some embodiments, the sum of the thickness of the extended portion of the support layer 31 relative to the display layer 10 in the first direction and the thickness of the filling layer 40 may be substantially the same as the thickness of the non-extending region on the flexible display panel 100 (the sum of the thicknesses of the upper layer group 20, the display layer 10, and the lower layer group 30). In some embodiments, the sum of the thickness of the extended portion of the support layer 31 relative to the display layer 10 in the first direction and the thickness of the filling layer 40 being substantially the same as the thickness of the non-extending region of the flexible display panel 100, means that there is a certain difference between the sum of the thickness of the extended portion of the support layer 31 relative to the display layer 10 in the first direction and the thickness of the filling layer 40, and the thickness of the non-extending region of the flexible display panel 100. In some embodiments, the difference between the sum of the thickness of the extended portion of the support layer 31 relative to the display layer 10 in the first direction and the thickness of the filling layer 40, and the thickness of the non-extending region of the flexible display panel 100 falls within a range from 0 to 3 mm. In some embodiments, the difference between the sum of the thickness of the extended portion of the support layer 31 relative to the display layer 10 in the first direction and the thickness of the filling layer 40, and the thickness of the non-extending region of the flexible display panel 100 falls within a range from 0 to 2 mm In some embodiments, the difference between the sum of the thickness of the extended portion of the support layer 31 relative to the display layer 10 in the first direction and the thickness of the filling layer 40, and the thickness of the non-extending region of the flexible display panel 100 falls within a range from 0 to 1 mm.

In some embodiments, when at least one layer in the upper layer group 20 and at least one layer in the lower layer group 30 are respectively extended in the first direction, the filling layer 40 may be located between the extended portion of the at least one layer in the upper layer group 20 relative to the display layer 10 in the first direction and the extended portion of the at least one layer in the lower layer group 30 relative to the display layer 10 in the first direction. In some embodiments, when the cover plate layer 21 and the support layer 31 are respectively extended in the first direction, the filling layer 40 may be located between the extended portions of the cover plate layer 21 and the support layer 31 relative to the display layer 10 in the first direction. In some embodiments, the sum of the thicknesses of the extended portions of the cover plate layer 21 and the support layer 31 relative to the display layer 10 in the first direction and the thickness of the filling layer 40 may be the same as or substantially the same as the thickness of the non-extending region of the flexible display panel 100 (the sum of the thicknesses of the upper layer 20, the display layer 10 and the lower layer group 30). In some embodiments, the sum of the thicknesses of the extended portions of the cover plate layer 21 and the support layer 31 relative to the display layer 10 in the first direction and the thickness of the filling layer 40 being substantially the same as the thickness of the non-extending region of the flexible display panel 100, means that there is a certain difference between the sum of the thicknesses of the extended portions of the cover plate layer 21 and the support layer 31 relative to the display layer 10 in the first direction and the thickness of the filling layer 40, and the thickness of the non-extending region of the flexible display panel 100. In some embodiments, the difference of the sum of the thicknesses of the extended portions of the cover plate layer 21 and the support layer 31 relative to the display layer 10 in the first direction and the thickness of the filling layer 40, from the thickness of the non-extending region of the flexible display panel 100 falls within a range from 0 to 3 mm. In some embodiments, the difference of the sum of the thicknesses of the extended portions of the cover plate layer 21 and the support layer 31 relative to the display layer 10 in the first direction and the thickness of the filling layer 40, from the thickness of the non-extending region of the flexible display panel 100 falls within a range from 0 to 2 mm. In some embodiments, the difference of the sum of the thicknesses of the extended portions of the cover plate layer 21 and the support layer 31 relative to the display layer 10 in the first direction and the thickness of the filling layer 40, from the thickness of the non-extending region of the flexible display panel 100 falls within a range from 0 to 1 mm.

In some embodiments, as shown in FIG. 2, when all the layers in the upper layer group 20 and all the layers in the lower layer group 30 are extended in the first direction, the filling layer 40 may be located between the lowermost surface of the extended portion of the upper layer group 20 relative to the display layer 10 in the first direction and the uppermost surface of the extended portion of the lower layer group 30 relative to the display layer 10 in the first direction. In some embodiments, the thickness of the filling layer 40 may be the same or substantially the same as the thickness of the display layer 10. In some embodiments, the thickness of the filling layer 40 being substantially the same as the thickness of the display layer 10, means that there is a certain difference between the thickness of the filling layer 40 and the thickness of the display layer 10. In some embodiments, the difference between the thickness of the filling layer 40 and the thickness of the display layer 10 falls within a range from 0 to 3 mm. In some embodiments, the difference between the thickness of the filling layer 40 and the thickness of the display layer 10 falls within a range from 0 to 2 mm. In some embodiments, the difference between the thickness of the filling layer 40 and the thickness of the display layer 10 falls within a range from 0 to 1 mm. In some embodiments, since at least one layer in the upper layer group 20 and the corresponding layer in the non-extending region of the flexible display panel 100 may be formed in a non-integrated manner, the at least one layer in the upper layer group 20 may have a thickness different from the corresponding layer in the non-extending region of the flexible display panel 100. In some embodiments, in the case that all layers in the upper layer group 20 and all layers in the lower layer group 30 are extended in the first direction, if the extended portion of at least one layer of the upper layer group 20 and/or the lower layer group 30 relative to the display layer in the first direction has a thickness smaller than that of the corresponding layer in the non-extending region, the thickness of the filling layer 40 may be greater than the thickness of the display layer 10. In some embodiments, the thickness of the filling layer 40 may be 5 mm greater than the thickness of the display layer 10. In some embodiments, the thickness of the filling layer 40 may be 4 mm greater than the thickness of the display layer 10. In some embodiments, the thickness of the filling layer 40 may be 3 mm greater than the thickness of the display layer 10. In some embodiments, in the case that all layers in the upper layer group 20 and all layers in the lower layer group 30 are extended in the first direction, if the extended portion of at least one layer of the upper layer group 20 and/or the lower layer group 30 relative to the display layer in the first direction has a thickness greater than that of the corresponding layer in the non-extending region, the thickness of the filling layer 40 may be smaller than the thickness of the display layer 10. In some embodiments, the thickness of the filling layer may be 5 mm smaller than the thickness of the display layer. In some embodiments, the thickness of the filling layer may be 4 mm smaller than the thickness of the display layer. In some embodiments, the thickness of the filling layer may be 3 mm smaller than the thickness of the display layer.

In some embodiments, the filling layer 40 can not only make the overall thickness of the flexible display panel 100 uniform, but also prevent a tail end of the display layer 10 (that is, the end of the display layer 10 close to the extension portion 140 in the first direction) from being deformed and thus being split when bent around the predetermined axis 130. Specifically, there is a certain spacing between one end of the filling layer 40 (that is, the end of the filling layer 40 close to the tail end of the display layer 10 in the first direction) and the tail end of the display layer 10 in the first direction, and when the tail end of the display layer 10 is deformed, the spacing can provide space for the deformation of the display layer 10, and the filling layer 40 can limit the deformation of the tail end of the display layer 10, thereby preventing the tail end of the display layer 10 from being severely deformed and split. In some embodiments, the spacing between the one end of the filling layer 40 and the tail end of the display layer 10 in the first direction is from 0.1 mm to 1 mm. In some embodiments, the spacing between the one end of the filling layer 40 and the tail end of the display layer 10 in the first direction is from 0.1 mm to 2 mm. In some embodiments, the spacing between the one end of the filling layer 40 and the tail end of the display layer 10 in the first direction is from 0.1 mm to 3 mm.

In some embodiments, the material of the filling layer 40 may be a flexible material. In some embodiments, the Young's modulus of the flexible material is in a range from 2 Gpa to 6 Gpa. In some embodiments, the Young's modulus of the flexible material is in a range from 2 Gpa to 8 Gpa. In some embodiments, the Young's modulus of the flexible material is in a range from 2 Gpa to 80 Gpa. In some embodiments, the material of the filling layer 40 may include at least one of gel, silica gel, foam, and polyimide.

In some embodiments, the filling layer 40 may include a liquid with a certain viscosity, and when the flexible display panel 100 performs a winding movement or a sliding movement, the liquid in the filling layer 40 will flow due to the movement of the flexible display panel 100, and the displacement generated by the flow can compensate the deformation of the display layer 10 during the movement, thereby avoiding the poor display effect of the flexible display panel 100 due to the deformation of the display layer 10. In some embodiments, the viscosity of the liquid in the filling layer 40 is in a range from 0.1 Pa s to 100 Pa s. In some embodiments, the viscosity of the liquid in the filling layer 40 is in a range from 0.5 Pa s to 80 Pa s. In some embodiments, the viscosity of the liquid in the filling layer 40 is in a range from 1 Pa s to 50 Pa s. In some embodiments, a material of the filling layer 40 may include one or more of liquid silica gel, liquid resin, liquid PVC, and the like.

In some embodiments, as shown in FIG. 6, no matter when the flexible display panel 100 performs a winding movement or a sliding movement, in order to enable the display region 101 of the flexible display panel 100 to present images to the user with the largest possible area in the state that the flexible display panel is fully unfolded, the bending portion 120 of the flexible display panel 100 may no longer be bent around the rotating shaft 200, but is located on the front of the flexible display panel 100, so that the bending portion 120 can be presented in the user's field of vision, and the display region 101 on the bending portion 120 can serve as an extended display region and present images to the user in combination with the main display region on the non-bending portion 110, while the non-display layer portion (that is, the extension portion 140) disposed at one end of the flexible display panel 100 in the first direction needs to be bent around the rotating shaft 200, and the filling layer 40 needs to be bent synchronously with the extension portion 140 around the rotating shaft 200. In order to ensure the sufficient bending of the filling layer 40, the filling layer may have a relative low stiffness in the first direction. In some embodiments, the stiffness value of the filling layer 40 in the first direction ranges from 2 Gpa to 10 Gpa. In some embodiments, the stiffness value of the filling layer 40 in the first direction ranges from 2 Gpa to 12 Gpa. In some embodiments, the stiffness value of the filling layer 40 in the first direction ranges from 2 Gpa to 80 Gpa.

In some embodiments, since the filling layer 40 needs to be bent synchronously with the corresponding extension portion 140 at one end of the flexible display panel 100, the length of the filling layer 40 is substantially the same as the extension portion 140 in the first direction.

In some embodiments, as shown in FIG. 6, when the flexible display panel 100 is fully unfolded, a part of the extension portion 140 at one end of the flexible display panel 100 in the first direction can be bent around the rotating shaft 200, while the other part is still located on the back of the non-bending portion 110, and accordingly, the filling layer 40 may include a first region 41 and a second region 42 in the first direction, wherein the first region 41 is closer to the display layer 10 than the second region 42. When the filling layer 40 is bent around the rotating shaft 200, the first region 41 may be bent around the rotating shaft, while the second region 42 is located on the back of the non-bending portion 110 and is not bent around the rotating shaft 200. Therefore, the filling layer 40 may have different filling materials in the first region 41 and the second region 42, so that the stiffness of the filling layer 40 in the first region 41 is lower than that in the second region 42. In some embodiments, the stiffness difference between the first region 41 and the second region 42 of the filling layer 40 is in a range from −7 Gpa to 4 Gpa. In some embodiments, the stiffness difference between the first region 41 and the second region 42 of the filling layer 40 is in a range from −7 Gpa to 6 Gpa. In some embodiments, the stiffness difference between the first region 41 and the second region 42 of the filling layer 40 is in a range from −7 Gpa to 74 Gpa. In some embodiments, the filling material of the filling layer 40 in the first region 41 may include at least one of PI, PET, PEN\PMMA\PC\glass, steel sheet, alloy, and carbon fiber. In some embodiments, the filling material of the filling layer 40 in the second region 42 may include at least one of gel, silica gel, foam and polyimide.

Figure 9:
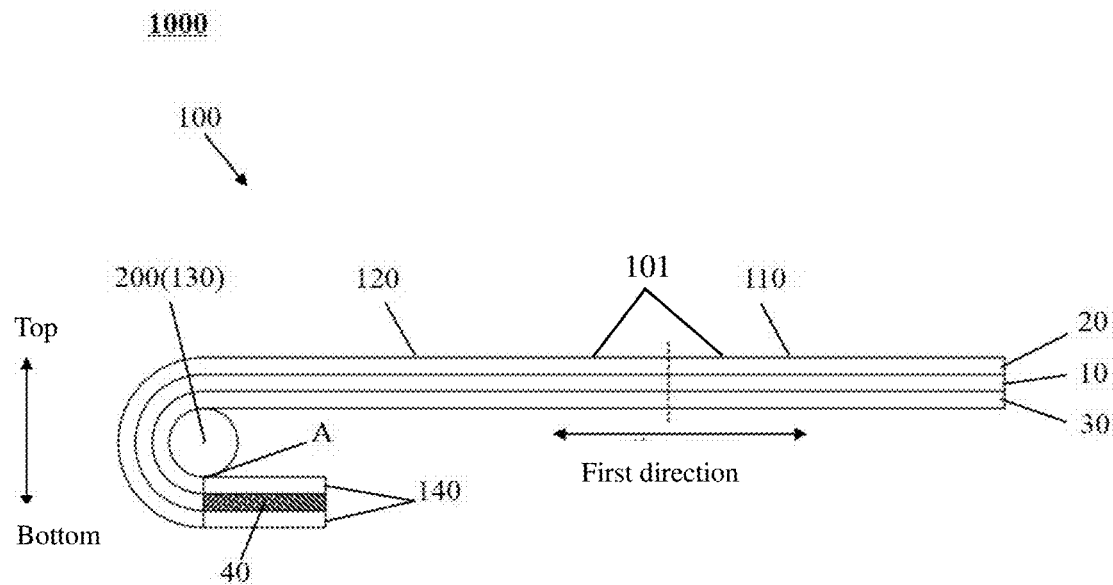
FIG. 9 is a fourth partial structural schematic diagram of a flexible display panel in which at least one layer of an upper layer group and a lower layer group are respectively extended in a first direction according to some embodiments of the present application.

In some embodiments, as shown in FIG. 9, when the flexible display panel 100 is fully unfolded by the sliding movement in the first direction, the non-extending region (the bending portion 120) of the flexible display panel 100 may be bent around the rotating shaft 200. In some embodiments, the non-extending region of the flexible display panel 100 may be bent by 180° around the rotating shaft 200, and the tail end of the display layer 10 (the end closer to the extension portion 140) is located at the lowest position A of the rotating shaft 200; at this time, the extension portion 140 at one end of the flexible display panel 100 does not need to be bent around the rotating shaft 200, and thus the filling layer 40 does not need to be bent either, and may have a relatively high stiffness in the first direction. In some embodiments, the stiffness value of the filling layer in the first direction may range from 2 Gpa to 10 Gpa. In some embodiments, the stiffness value of the filling layer in the first direction may range from 2 Gpa to 12 Gpa. In some embodiments, the stiffness value of the filling layer in the first direction may range from 2 Gpa to 80 Gpa. In some embodiments, the material of the filling layer 40 may include at least one of PI, PET, PEN\PMMA\PC\glass, steel sheet, alloy, and carbon fiber.

In some embodiments, in order to control the image display of the flexible display panel 100, the flexible display panel may further include a flexible circuit board (not shown in the figure), wherein the flexible circuit board may be used to connect the flexible display panel 100 with a mainboard circuit of the terminal device, so as to transmit a control signal to the display layer 10 of the flexible display panel 100, and the display layer 10 can perform corresponding image display based on the control signal. In some embodiments, the flexible circuit board may be connected with the upper layer group 20. In some embodiments, the flexible circuit board can be connected with the touch layer 22, and a touch signal generated by the touch layer 22 can be transmitted to the mainboard circuit of the terminal device through the flexible circuit board, so as to realize a touch operation corresponding to the touch signal and achieve different image display. In some embodiments, the flexible circuit board may be connected with an extended end of the upper layer group 20, or connected with an end of the upper layer group away from the extended end thereof. In some embodiments, the flexible circuit board may be connected with the display layer 10. In some embodiments, the flexible circuit board may be connected with the display driving layer 12. In some embodiments, the flexible circuit board may be connected with the pixel driving circuit (for example, a TFT device) in the display driving layer 12, the display driving layer 12 may generate an image signal based on the control signal, and drive the OLED light emitting layer 11 to emit light based on the image signal, thereby achieving the image display of the display layer 10. In some embodiments, the flexible circuit board may be connected with an end of the display layer 10 close to the extended end of the upper layer group 20 and/or the lower layer group 30. In some embodiments, the flexible circuit board may be connected with an end of the display layer 10 away from the extended end of the upper layer group 20 and/or the lower layer group 30. It can be understood that, the end of the display layer 10 away from or close to the extended end of the upper layer group and/or the lower layer group may be the end of the display layer 10 away from or close to the extended portion of the upper layer group 20 and/or the lower layer group 30 relative to the display layer 10 in the first direction. In some embodiments, the flexible circuit board may further be connected with an extended end or a non-extended end of the lower layer group 20. In some embodiments, the flexible circuit board may include integrated circuits, capacitors, resistors, diodes, and the like, or combinations thereof. In some embodiments, the flexible circuit board may be connected with the flexible display panel in a manner including but not limited to, welding, gluing, plugging, and the like. For example, the flexible circuit board can be welded to pins of the flexible display panel; for another example, the flexible circuit board includes pin headers while the flexible display panel is provided with female pin headers corresponding to the pin headers, or the flexible circuit board includes female pin headers while the flexible display panel is provided with pin headers corresponding to the female pin headers, and by inserting the pin headers into the female pin headers, the connection between the flexible circuit board and the flexible display panel can be achieved. In some embodiments, the flexible circuit board may include a single-sided flexible board, a double-sided flexible board, a multi-layer flexible board, a High Density Interconnection (HDI) rigid-flex board, and the like.

In some embodiments, the flexible circuit board further may be used to connect with a power interface and/or a signal interface on the flexible display panel 100.

In some embodiments, the flexible display panel 100 may further include a power interface (not shown in the figure). In some embodiments, the power interface may be used to connect with a power source that provides power required for operation of the flexible display panel 100. In some embodiments, the flexible display panel 100 may not include a power interface, and a built-in battery is used to provide power to the flexible display panel 100.

In some embodiments, the flexible display panel 100 may further include a signal interface (not shown in the figure). In some embodiments, the signal interface may be used to connect the flexible display panel with a signal source. In some embodiments, the signal source may be any type of terminal devices capable of outputting image data, including but not limited to mobile phones, tablet computers, personal computers, televisions, game consoles, and the like. In some embodiments, the signal interface may be a wired interface. In some embodiments, the wired interface may include, but is not limited to, an interactive Digital Visual Interface (DVI) interface, a High Definition Multimedia Interface (HDMI) interface, a D-subminiature (D-sub) interface, a Video Graphics Array (VGA) interface, a Data Processing (DP) interface, a Universal Serial Bus (Universal Serial Bus, USB) interface, and the like. In some embodiments, the signal interface further may be a wireless interface. In some embodiments, the wireless interface may be any type of wireless network interface, including but not limited to a local area network (LAN) interface, a Wide Area Network (WAN) interface, a Wireless Local Area Network (WLAN) interface, a Metropolitan Area Network (MAN) interface, a Bluetooth network interface, a ZigBee wireless network interface, a Near-field Communication (NFC) network interface, and the like.

In some embodiments, the power interface and the signal interface further can be implemented in one piece, that is, the flexible display panel 100 can provide one interface, which can provide a power connection with the flexible display panel 100 while connecting the flexible display panel 100 with the signal source. It should be noted that the flexible display panel 100 may not include a power interface or a signal interface, while the display performance and support performance of the flexible display panel 100 will not be affected.

In some embodiments, the end of the flexible display panel 100 provided with the extension portion 140 may be used for connection with a terminal device. For example, the end of the flexible display panel 100 provided with the extension portion 140 may be provided with a power interface and/or a signal interface, and the end of the flexible display panel 100 provided with the extension portion 140 may be connected to the terminal device through the power interface and/or the signal interface, so that the terminal device can provide the flexible display panel 100 with power required for its operation and/or control signals for image display through the power interface and/or the signal interface. In some embodiments, the end of the flexible display panel 100 provided with the extension portion 140 may be an extended end of the flexible display panel 100 in the first direction (also referred to as an extended end of the flexible display panel 100), and the extended end of the flexible display panel 100 in the first direction may be an end of the extended portion of at least one layer of the upper layer group 20 and/or the lower layer group 30 in the flexible display panel 100 relative to the display layer 10 in the first direction. In some embodiments, the extension portion 140 may include an extended portion of at least one layer of the upper layer group 20 and/or the lower layer group 30 relative to the display layer 10 in the first direction, and the extended portion of the at least one layer of the upper layer group 20 and/or the lower layer group 30 relative to the display layer 10 in the first direction may be provided at only one of the ends of the flexible display panel 100 in the first direction, that is, only one of the two ends of the flexible display panel in the first direction is the extended end of the flexible display panel. In some embodiments, the extended portions of at least one layer of the upper layer group 20 and/or the lower layer group 30 relative to the display layer 10 in the first direction may be disposed at two ends of the flexible display panel 100 in the first direction, that is, the two ends of the flexible display panel 100 in the first direction are both extended ends of the flexible display panel 100. In some embodiments, the extension portion 140 may include an extended portion of at least one layer of the upper layer group 20 and/or the lower layer group 30 relative to the display layer 10 in a second direction, the extended portion of the at least one layer of the upper layer group 20 and/or the lower layer group 30 relative to the display layer 10 in the second direction may be provided at only one of the ends of the flexible display panel 100 in the second direction, that is, only one of the two ends of the flexible display panel 100 in the second direction is the extended end of the flexible display panel 100. In some embodiments, the extended portions of at least one layer of the upper layer group 20 and/or the lower layer group 30 relative to the display layer 10 in the second direction may be provided at two ends of the flexible display panel in the second direction, that is, the two ends of the flexible display panel 100 in the second direction are both extended ends of the flexible display panel 100. In some embodiments, the extended end of the flexible display panel may include the extension portion 140. In the present application, the extension portion 140 is provided on at least one end of the flexible display panel 100 in the first direction.

Figure 10:
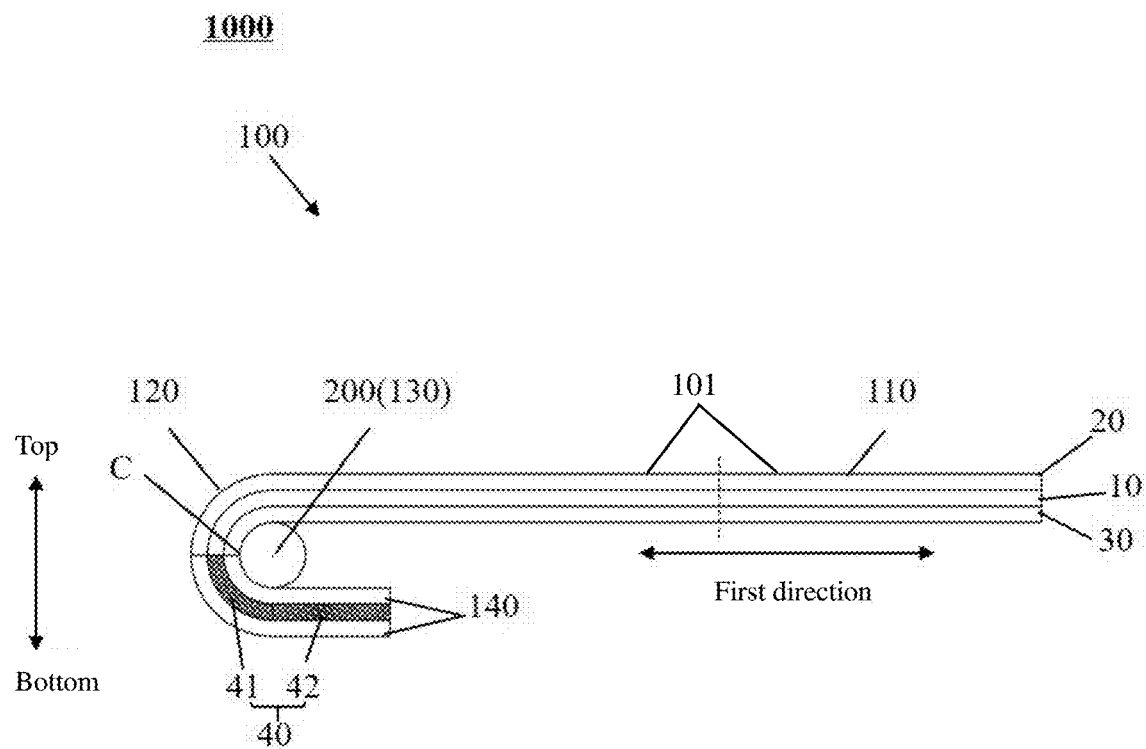
FIG. 10 is a fifth partial structural schematic diagram of a flexible display panel in which at least one layer of an upper layer group and a lower layer group are respectively extended in a first direction according to some embodiments of the present application.

In some embodiments, the extended end (the extension portion 140) of the flexible display panel 100 may be used to connect with the movement mechanism of the terminal device, so as to realize the sliding movement of the flexible display panel 100. Specifically, the movement mechanism can drive the extended end of the flexible display panel 100 to move relative to the terminal device in the first direction, so that the bending portion 120 of the flexible display panel 100 can move through the rotating shaft 200 in the first direction to enter the back of the non-bending portion 110 (also referred as the storage region) or exit from the storage region, and at the same time, the non-bending portion 110 of the flexible display panel 100 can move in a direction opposite to a moving direction of the bending portion 120 under the driving of the bending portion 120; when the flexible display panel 100 is unfolded, part or all of the bending portion 120 exists from the storage region, the bending portion 120 exiting from the storage region can move to the front of the flexible display panel 100, and part or all of the display region 101 on the bending portion 120 can serve as an extended display region and present images to the user in combination with the main display region on the non-bending portion 110; and when the flexible display panel 100 is folded, part or all of the bending portion 120 can enter the storage region, the bending portion 120 located in the storage region cannot be observed by the user, and the display region 101 on the bending portion 120 located in the storage region may not perform the image display (for example, in a screen-off state); thus, the flexible display panel 100 can be folded or unfolded. In some embodiments, when the flexible display panel 100 is fully unfolded, the tail end of the display layer 10 of the flexible display panel (that is, the end of the display layer 10 close to the extended end of the flexible display panel 100) can move to the lowest position A of the rotating shaft 200 (as shown in FIG. 9), and at this time, the extension portion 140 of the flexible display panel 100 does not need to be bent around the rotating shaft 200, so the filling layer 40 corresponding to the extension portion 140 can have a higher stiffness, while part of the bent portion is still wound on the rotating shaft, is not located on the front of the flexible display panel 100, and does not perform image display, wherein the bending angle of this part of the bending portion around the rotating shaft 200 is 180°. In some embodiments, when the flexible display panel 100 is fully unfolded, the tail end of the display layer 10 can move to the uppermost position B of the rotating shaft (as shown in FIG. 6), and all of the bending portion 120 of the flexible display panel 100 can move to the front of the flexible display panel 100 to display images; at this time, the extension portion 140 is bent around the rotating shaft 200 with a bending angle of 180°, the filling layer 40 corresponding to the extension portion 140 is also bent around the rotating shaft 200, and thus the filling layer 40 corresponding to the extension portion 140 needs a lower stiffness. In some embodiments, as shown in FIG. 10, when the flexible display panel 100 is fully unfolded, the tail end of the display layer 10 may move to the position C between the position A and the position B of the rotating shaft 200; at this time, part of the bending portion is wound on the rotating shaft and not located on the front of the flexible display panel 100, the display region 101 on the bending portion 120 wound on the rotating shaft 200 cannot be observed by the user and does not perform the image display, and part of the extension portion 140 close to the tail end of the display layer 10 is also bent around the rotating shaft 200; in this case, the part of the bending portion that is bent around the rotating shaft and the part of the extension portion 140 that is bent around the rotating shaft 200 are both bent with a bending angle between 0° and 180°, and the sum of the bending angles of the part of the bending portion that is bent around the rotating shaft 200 and the part of the extension portion 140 that is bent around the rotating shaft 200 is 180°; at this time, a part of the filling layer 40 corresponding to the extension portion 140 is bent around the rotating shaft 200, while the other part does not need to be bent, and thus the filling layer 40 can be divided into a first region 41 and a second region 42, wherein the first region 41 is close to the tail end of the display layer 10 and needs to be bent around the rotating shaft, and thus have a lower stiffness to facilitate bending, while the second region 42 is away from the tail end of the display layer 10 and does not need to be bent, and thus may have a higher stiffness. In some embodiments, the filling layer 40 may include only the first region 41, that is, when the filling layer 40 is bent around the rotating shaft 200, a tail end of the filling layer 40 (that is, the end of the filling layer 40 away from the display layer 10) is located at the lowest position A of the rotating shaft 200.

In some embodiments, the rotating shaft 200 may facilitate the bending portion 120 of the flexible display panel 100 to be bent around the rotating shaft 200, and when the bending portion 120 exits from the storage region and moves to the front of the flexible display panel 100 so that the bending portion 120 can be observed by the user and that the display region 101 on the bending portion 120 can perform image display, the rotating shaft 200 can further support the bending portion 120 located on the front of the flexible display panel 100, so as to ensure that the display region on the bending portion 120 has a relative flat display surface when performing the image display. In some embodiments, the movement mechanism may be a linear movement mechanism. In some embodiments, the linear movement mechanism may include a lead screw-nut mechanism, a crank-slider mechanism, a cam mechanism, a rack and pinion mechanism, a belt drive mechanism, a chain drive mechanism, a linear guide mechanism, and the like, or any combination thereof. In some embodiments, the movement mechanism can be driven by means of a motor drive, a cylinder drive, a hydraulic drive, or the like, so that the movement of the movement mechanism can be accurately controlled, and thus a distance of the extended end of the flexible display panel 100 moving in the first direction under driving of the movement mechanism can be accurately controlled.

In some embodiments, the extended end of the flexible display panel 100 may be connected with the movement mechanism by means of a fixed connection or a detachable connection. In some embodiments, the manner of the fixed connection may include, but is not limited to, an integral forming, an adhesive connection, a pin connection, and the like. In some embodiments, the manner of the detachable connection may include, but is not limited to, a snap connection, a plug connection, and the like. In some embodiments, the connection strength between the extended end of the flexible display panel 100 and the movement mechanism may affect the extended length of the upper layer group 20 and/or the lower layer group 30 in the flexible display panel 100 relative to the display layer 10 in the first direction. In some embodiments, the higher the connection strength between the extended end of the flexible display panel 100 and the movement mechanism, the shorter the extended length of the upper layer group 20 and/or the lower layer group 30 in the flexible display panel 100 relative to the display layer 10 in the first direction, and the shorter the length of the extension portion 140 relative to the display layer 10 in the first direction.

In some embodiments, the movement mechanism may be connected only with the extended end of the flexible display panel 100 to drive the bending portion 120 of the flexible display panel 100 to move through the rotating shaft 200 in the first direction, and the non-bending portion 110 may move in a direction opposite to the first direction under the driving of the bending portion 120.

Figure 11:
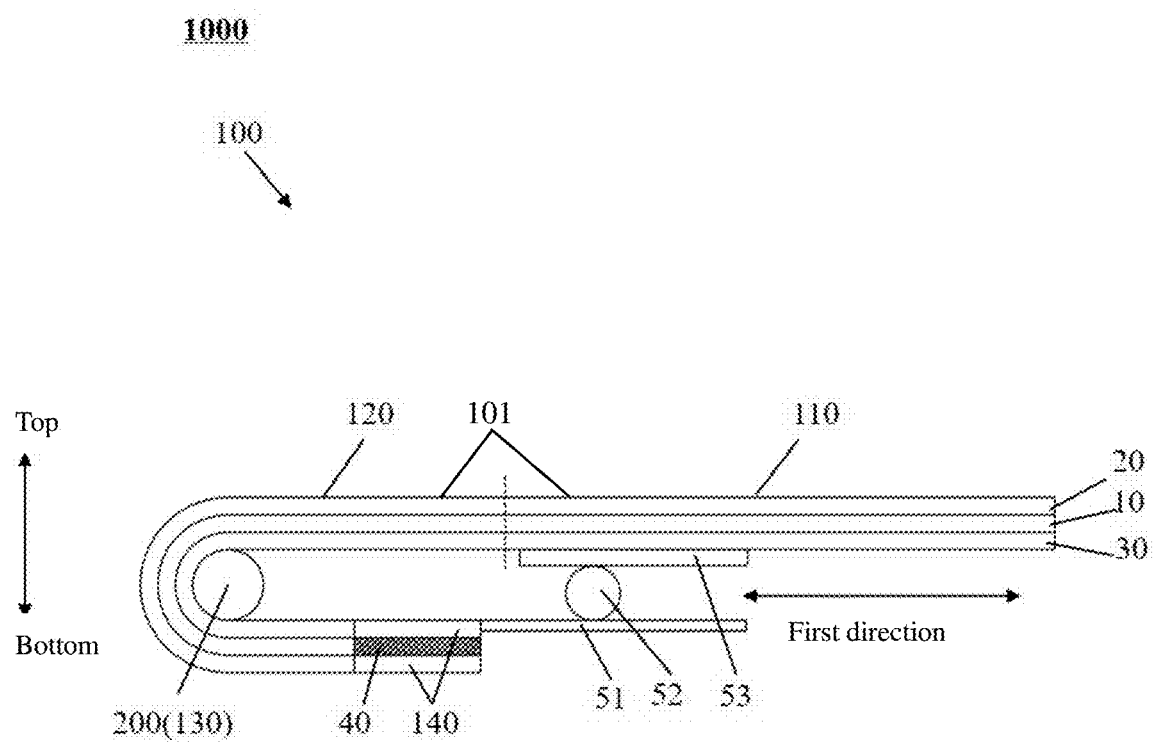
FIG. 11 is a first partial structural schematic diagram of a flexible display panel connected with a movement mechanism according to some embodiments of the present application.

In some embodiments, the movement mechanism further may be connected with the non-bending portion 110, and the non-bending portion 110 may be simultaneously driven by the bending portion 120 and the movement mechanism to move in the first direction. In some embodiments, as shown in FIG. 11, the movement mechanism may include a first rack 51, a gear 52 and a second rack 53, wherein the first rack 51 is connected to the extended end of the flexible display panel 100, the second rack 53 is connected to a lower surface of the non-bending portion 110 of the flexible display panel 100, and the gear 52 is located between the first rack 51 and the second rack 53 and meshes with the first rack 51 and the second rack 53 respectively. In some embodiments, by driving the first rack 51 to move in the first direction, the first rack 51 can drive the extended end of the flexible display panel 100 to move in the first direction, so that the bending portion 120 of the flexible display panel 100 can move in the first direction and through the rotating shaft 200 to enter the storage region or exist from the storage region, and the movement of the first rack 51 can be transmitted to the second rack 53 through the gear 52, so that the second rack 53 can move in a direction opposite to the moving direction of the first rack 51, and that the non-bending portion 110 of the flexible display panel 100 can move in a direction opposite to the first direction. In some embodiments, the gear 52 can be driven to rotate clockwise or counterclockwise, and when the gear 52 rotates, the first rack 51 and the second rack 53 can move relative to each other in the first direction at the same time. In some embodiments, the bending portion 120 may enter or exit from the storage region through the rotating shaft 200 in the first direction under the driving of the first rack 51, and the non-bending portion 110 can move in a direction opposite to the moving direction of the first rack 51 under the driving of the second rack 53. In some embodiments, the second rack 53 can be driven to move in the first direction, so that the second rack 53 can drive the non-bending portion 110 of the flexible display panel 100 to move in the first direction, and the movement of the second rack 53 can be transmitted to the first rack 51 through the gear 52, so that the first rack 51 can move in a direction opposite to the moving direction of the second rack 53, thereby driving the bending portion 120 to move through the rotating shaft 200 in a direction opposite to the moving direction of the second rack 53 to enter the storage region or exit from the storage region. By adopting the movement mechanism in the above-mentioned embodiments, there will be no relatively large pulling force between the non-bending portion 110 and the bending portion 120 when the flexible display panel 100 performs the sliding movement, thereby preventing the flexible display panel 100 from being deformed or even damaged due to an excessively large pulling force.

Figure 12:
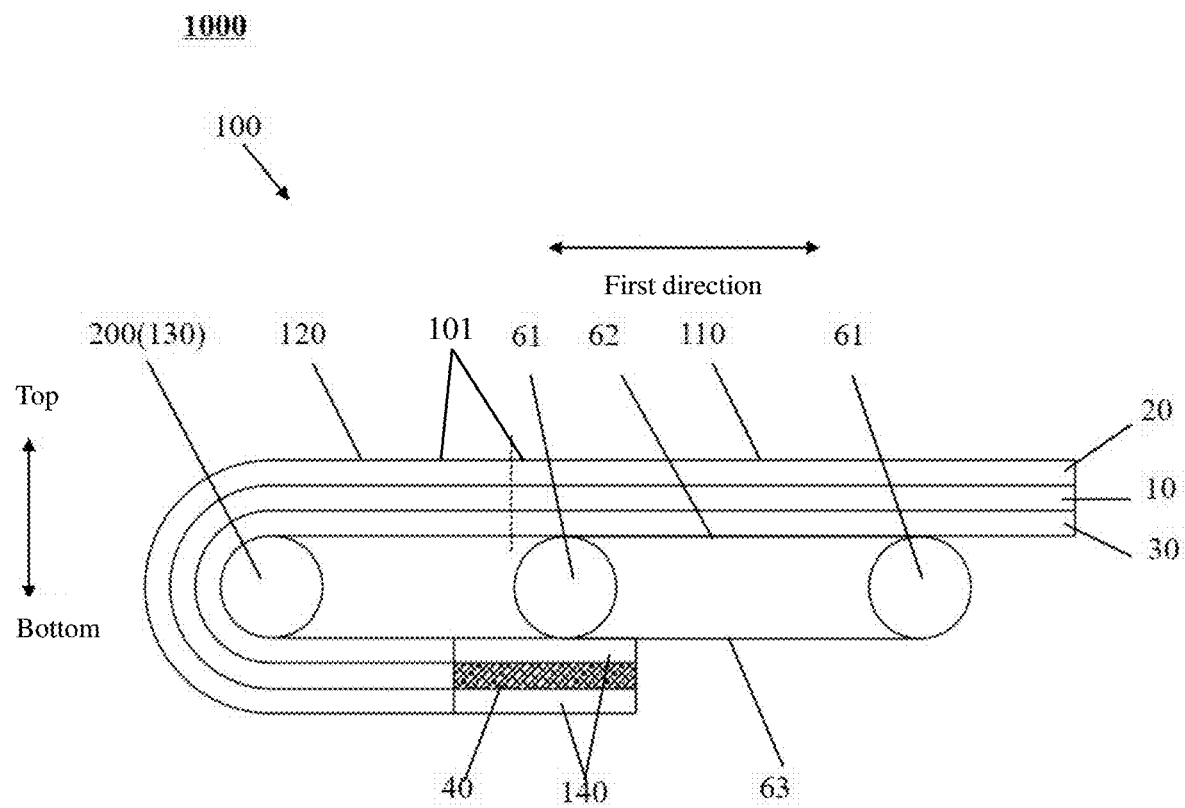
FIG. 12 is a second partial structural schematic diagram of a flexible display panel connected with a movement mechanism according to some embodiments of the present application.

In some embodiments, in order to prevent a large pulling force between the non-bending portion 110 and the bending portion 120 when the flexible display panel 100 performs the sliding movement, the movement mechanism may further adopt a synchronous belt transmission mechanism. In some embodiments, as shown in FIG. 12, the synchronous belt transmission mechanism may include a transmission belt and two pulleys 61 of the same size. The extended end of the flexible display panel 100 can be connected with a lower portion 63 of the transmission belt, and a lower surface of the non-bending portion 110 of the flexible display panel 100 can be connected with an upper portion 62 of the transmission belt; by driving the pulleys 61 to rotate, the upper portion 62 of the transmission belt can drive the non-bending portion 110 to move in the first direction, and the lower portion 63 of the transmission belt can drive the bending portion 120 of the flexible display panel 100 to move through the rotating shaft 200 in a direction opposite to the moving direction of the non-bending portion to enter the storage region or exit from the storage region.

In some embodiments, when the extension portion 140 of the flexible display panel 100 is disposed at only one end of the flexible display panel 100 in the first direction, that is, the extended end of the flexible display panel 100 is only one of the ends of the flexible display panel 100 in the first direction, there is only one movement mechanism connected to the extended end of the flexible display panel 100 in this case, and under the driving of the movement mechanism, one end (the extended end) of the flexible display panel 100 moves through the rotating shaft 200 in the first direction to enter the storage region or exit from the storage region, thereby achieving the folding or unfolding of the flexible display panel 100. In some embodiments, the end of the flexible display apparatus 1000 that is not the extended end may be connected to a housing of the terminal device. In some embodiments, the end of the flexible display apparatus 1000 that is not the extended end may be connected to the flexible circuit board.

Figure 13:
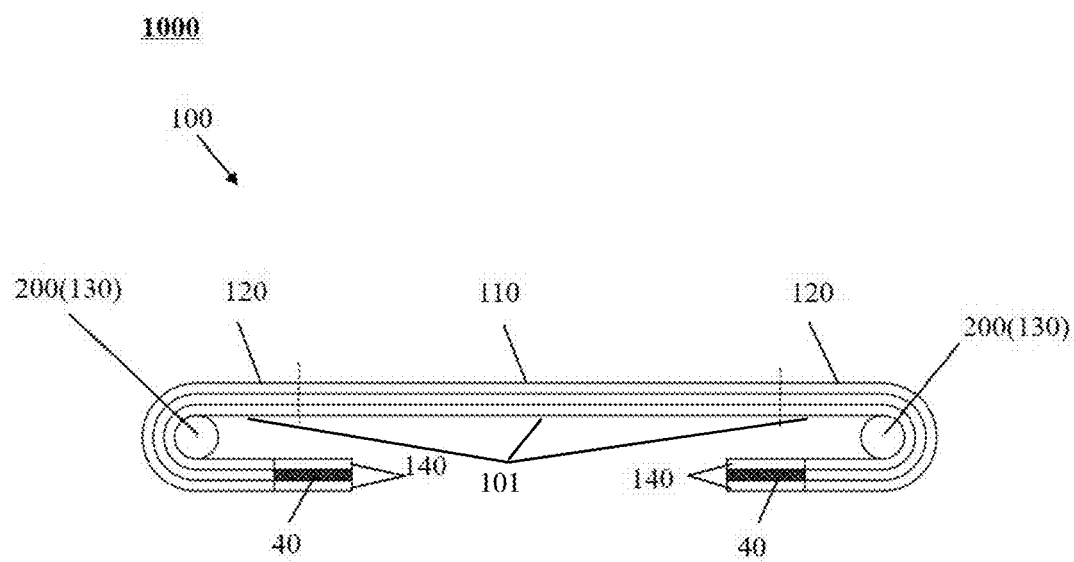
FIG. 13 is a structural schematic diagram of a flexible display panel provided with extended portions at two ends in a first direction according to some embodiments of the present application.

In some embodiments, as shown in FIG. 13, the extension portion 140 may be disposed at two ends of the flexible display panel 100 in the first direction, that is, the two ends of the flexible display panel 100 in the first direction are both extended ends of the flexible display panel 100, there may be two movement mechanism connected to the extended ends of the flexible display panel 100, and correspondingly, the flexible display panel 100 may include two bending portions 120 and corresponding two rotating shafts 200; the two movement mechanisms can respectively drive the two ends (the two ends are both extended ends) of the flexible display panel 100 to move in the first direction, so that the two bending portions 120 of the flexible display panel 100 can respectively move through the corresponding two rotating shafts 200 and enter or exit from the storage region, wherein the corresponding two rotating shafts 200 move a corresponding distance in a direction parallel to the first direction, and when the two extended ends of the flexible display panel 100 move close to or away from each other in the first direction, the corresponding two bending portions 120 and two rotating shafts 200 move close to or away from each other in the first direction (or the parallel direction thereof), so that the flexible display panel 100 can be folded or unfolded. In this case, the flexible display panel 100 may occupy a small space when it is folded. In some embodiments, when two ends of the flexible display panel 100 in the first direction are both extended ends of the flexible display panel 100, one of the extended ends of the flexible display panel 100 may be connected with the movement mechanism of the terminal device, while the other extended end may not be connected with the movement mechanism. In some embodiments, the end of the flexible display panel 100 that is not connected with the movement mechanism may be connected with a housing of the terminal device. In some embodiments, the end of the flexible display panel 100 that is not connected with the movement mechanism may be connected with the flexible circuit board.

In some embodiments, the extended end (the extension portion 140) of the flexible display panel 100 can be used to connect with the rotating shaft 200, and the rotation of the rotating shaft can drive the flexible display panel 100 to perform a winding movement around the rotating shaft 200. In some embodiments, when the rotating shaft rotates clockwise or counterclockwise around its axis, the rotating shaft 200 can drive the extended end of the flexible display panel 100 to start to bend around the rotating shaft 200, and the bending portion 120 of the flexible display panel is gradually wound on the rotating shaft 200, thereby achieving the folding of the flexible display panel 100, making the flexible display panel 100 occupy a small space; and when the rotating shaft 200 rotates around its axis in a direction opposite to the rotating direction of the rotating shaft 200 for folding the flexible display panel 100, the bending portion 120 wound on the rotating shaft 200 can be unfolded around the rotating shaft 200 to perform the image display. In some embodiments, the rotating shaft 200 can not only allow the bending portion 120 of the flexible display panel 100 to be bent around the rotating shaft, but also can wind the bending portion 120 thereon to fold the flexible display panel 100, and moreover, when the bending portion 120 is unfolded around the rotating shaft 200 and part or all of the bending portion 120 is located on the front of the flexible display panel 100, the rotating shaft 200 can further support the bending portion 120 located on the front of the flexible display panel 100 to ensure that the display region 101 on the bending portion 120 located on the front of the flexible display panel 100 has a relatively flat display surface. In the present embodiment, the flexible display panel 100 may include only the bending portion 120. In some embodiments, the flexible display panel may include a bending portion 120 and a non-bending portion 110. In some embodiments, the flexible display panel 100 may include a driving device for driving the rotating shaft 200 to rotate. In some embodiments, the driving device may include, but is not limited to, a spring drive mechanism, a motor drive mechanism, a ratchet drive mechanism, a gear drive mechanism, and the like.

In some embodiments, the extended end of the flexible display panel 100 may be connected with the rotating shaft 200 in a manner of a fixed connection or a detachable connection. In some embodiments, the manner of the fixed connection may include, but is not limited to, an integral forming, an adhesive connection, a pin connection, and the like. In some embodiments, the manner of the detachable connection may include, but is not limited to, a snap connection, a plug connection, and the like.

Figure 14:
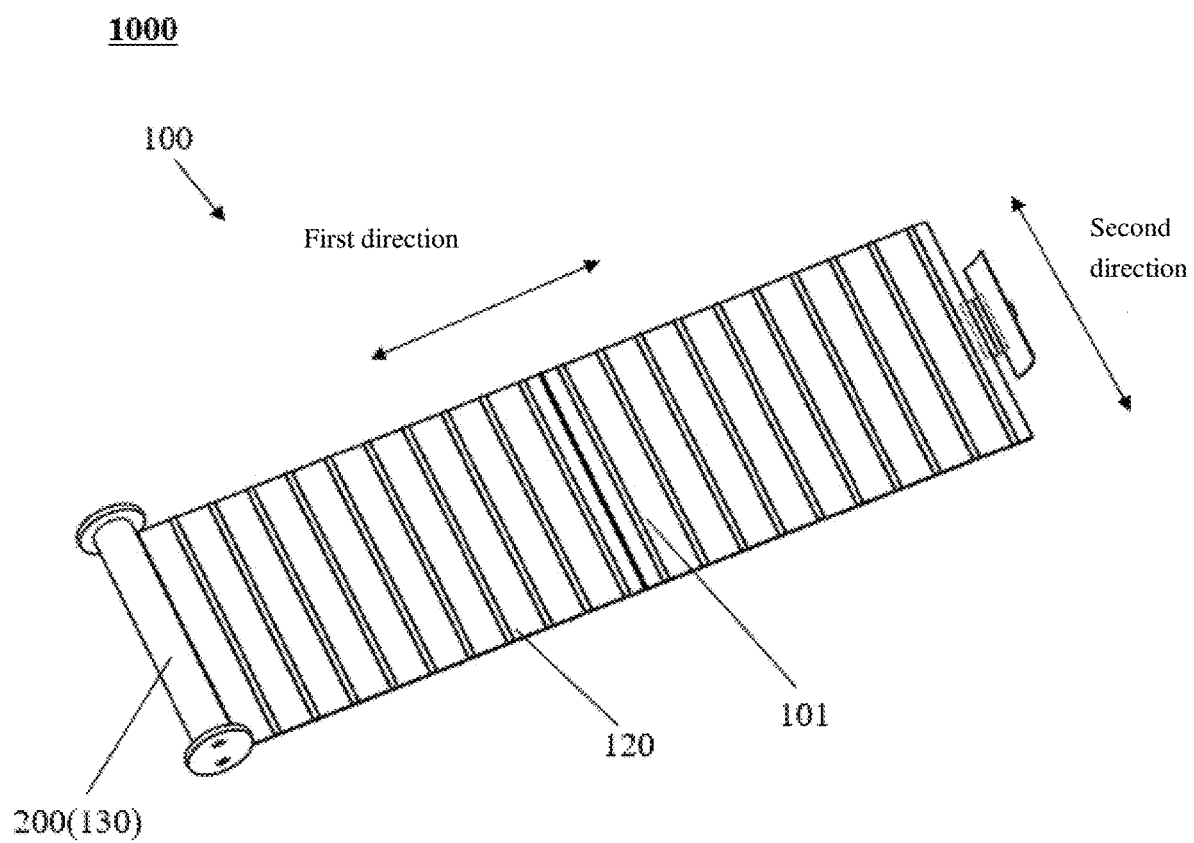
FIG. 14 is a schematic structural diagram of a flexible display panel in a single-shaft winding form according to some embodiments of the present application.

In some embodiments, when the extension portion 140 of the flexible display panel 100 is disposed at only one end of the flexible display panel in the first direction, that is, the extended end of the flexible display panel 100 is only one of the ends of the flexible display panel 100 in the first direction, the flexible display panel may be connected with only one rotating shaft, and the flexible display panel may be in a single-shaft winding form. In some embodiments, as shown in FIG. 14, the end of the flexible display panel 100 provided with the extension portion 140 is connected with the rotating shaft 200, and the rotation of the rotating shaft 200 around its axis can drive the end of the flexible display panel provided with the extension portion 140 to start to bend around the rotating shaft 200, so that the bending portion 120 of the flexible display panel can be gradually wound on the rotating shaft 200, thereby folding the flexible display panel 100; when the rotating shaft 200 rotates in a direction opposite to the rotating direction of the rotating shaft 200 for folding the flexible display panel, part or all of the bending portion 120 wound on the rotating shaft 200 can be unfolded around the rotating shaft 200, and the display region 101 on the bending portion 120 can serve as an extended display region and present images to the user in combination with the main display region on the non-bending portion 110, thereby increasing the display area of the flexible display panel 100. In some embodiments, the end of the flexible display panel 100 not provided with the extension portion 140 may be connected to a housing of the terminal device. In some embodiments, the end of the flexible display panel 100 not provided with the extension portion 140 may be connected to the flexible circuit board.

Figure 15:
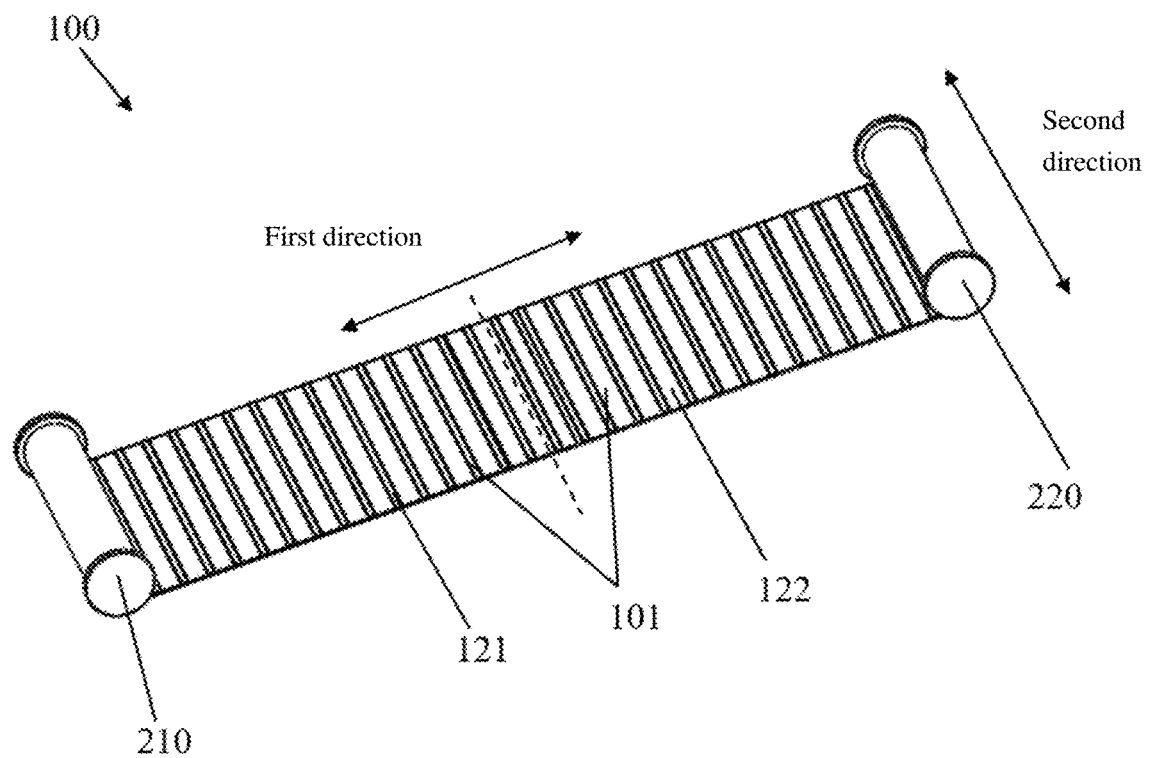
FIG. 15 is a schematic structural diagram of a flexible display panel in a two-shaft winding form according to some embodiments of the present application.
Figure 16:
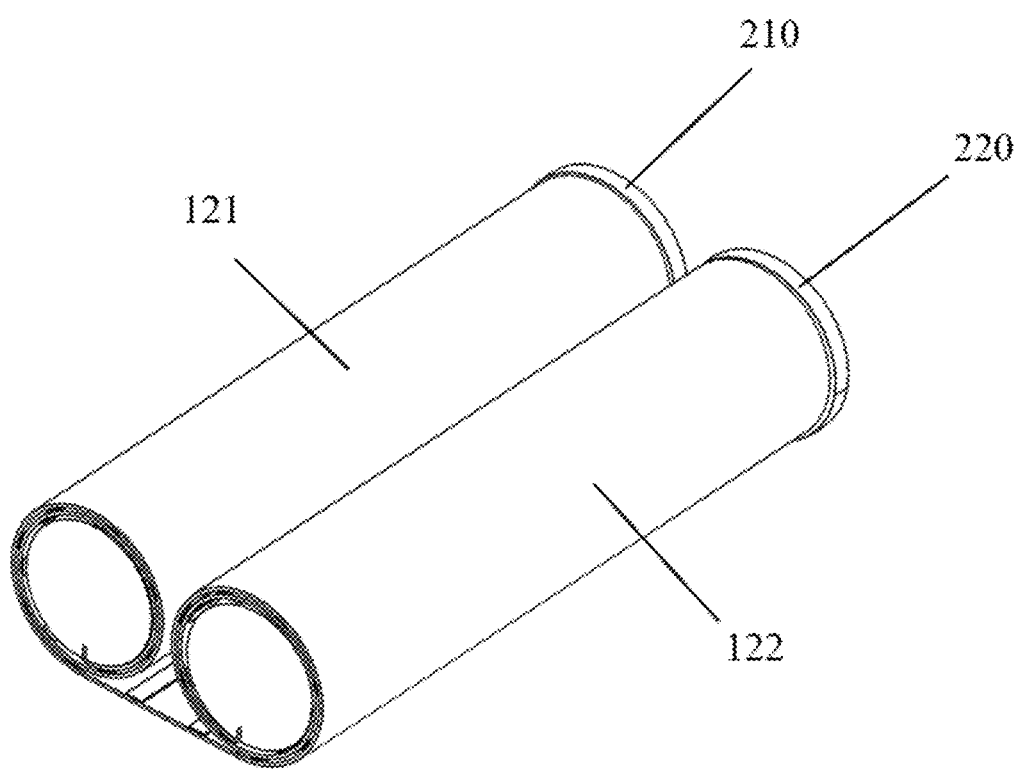
FIG. 16 is a schematic structural diagram of a flexible display panel in a two-shaft winding form according to some embodiments of the present application when it is folded.

When the extension portion 140 of the flexible display panel 100 is disposed at two ends of the flexible display panel 100 in the first direction, that is, when the two ends of the flexible display panel 100 in the first direction are both extended ends of the flexible display panel 100, the flexible display panel 100 may be in a two-shaft winding form. In some embodiments, as shown in FIG. 15, the flexible display panel 100 may include a first rotating shaft 210 and a second rotating shaft 220, and the two ends of the flexible display panel 100 provided with the extension portions 140 may be respectively connected with the first rotating shaft 210 and the second rotating shaft 220. Axes of the first rotating shaft 210 and the second rotating shaft 220 are both substantially perpendicular to the first direction or substantially parallel to the second direction, and the first rotating shaft 210 and the second rotating shaft 220 respectively correspond to a first bending portion 121 and a second bending portion 122. In some embodiments, when the flexible display panel 100 needs to be folded, the first rotating shaft 210 and the second rotating shaft 220 can be rotated with opposite rotation directions, the first bending portion 121 and/or the second bending portion 122 can be bent around the first rotating shaft under the driving of the first rotating shaft 210 and gradually wound on the first rotating shaft 210, and the second bending portion 122 and/or the first bending portion 121 can be bent around the second rotating shaft under the driving of the second rotating shaft 220 and gradually wound on the second rotating shaft 210; during the process of folding the flexible display panel 100, the first rotating shaft 210 and the second rotating shaft 220 can move in the first direction and close to each other, and when the flexible display panel is completely folded, a distance between the first rotating shaft 210 and the second rotating shaft 220 in the first direction is the smallest, and the flexible display panel 100 may be in an "8" shape. In some embodiments, the rotation directions of the first rotating shaft 210 and the second rotating shaft 220 may be the same, and when the flexible display panel 100 is completely folded, the distance between the first rotating shaft 210 and the second rotating shaft 220 in the first direction is the smallest, and the flexible display panel 100 may be in a shape of "binoculars" as shown in FIG. 16. In some embodiments, when the flexible display panel 100 needs to be unfolded, the first rotating shaft 210 and the second rotating shaft 220 are rotated, wherein the rotation directions of the first rotating shaft 210 and the second rotating shaft 220 can be the same or opposite, so that the first bending portion 121 and the second bending portion 122 can be unfolded around the first rotating shaft 210 and the second rotating shaft 220 under the driving of the first rotating shaft 210 and the second rotating shaft 220 respectively, and part or all of the first bending portion 121 and the second bending portion 122 can perform image display, and wherein the first rotating shaft 210 and the second rotating shaft 210 can jointly support part or all of the first bending portion 121 and the second bending portion 122 for performing the image display, so that part or all of the display region 101 on the first bending portion 121 and the second bending portion 122 which performs the image display, has a relatively flat display surface, thereby ensuring that the display effect of the flexible display panel 100 will not be affected.

In some embodiments, the flexible display panel 100 further may not include a rotating shaft 200, the winding movement of the flexible display panel 100 may be realized by manual assistance, and the user may directly wind up the flexible display panel 100 so that the flexible display panel 100 winds up by itself and is no longer wound around a rotating shaft. In this case, the flexible display panel 100 may be wound up from either end to the other end, or may be wound up from two ends to the middle. In some embodiments, when the flexible display panel 100 does not include a rotating shaft and needs manual assistance to perform the winding movement, either end of the flexible display panel 100 in the first direction may no longer be provided with an extension portion 140, and also, the display area of the flexible display panel 100 can be utilized to the greatest extent.

In some embodiments, the present application further provides a display apparatus 1000 including a flexible display panel, the display apparatus 1000 may include a terminal device, and a flexible display panel connected to the terminal device. The flexible display panel may be any flexible display panel 100 in one or more of the above embodiments of this specification. In some embodiments, the flexible display panel 100 may be fixedly connected to the terminal device, and the terminal device provides power and outputs display signals to the flexible display panel. In some embodiments, the flexible display panel 100 further may be detachably connected to the terminal device. When the display apparatus 1000 needs to display images, the flexible display panel 100 can be connected to the terminal device for image display; when the display apparatus 1000 does not need to display images, the flexible display panel 100 can be separated from the terminal device so as to be folded. The detachable connection between the flexible display panel 100 and the terminal device may include a pluggable wired connection. In some embodiments, the connection between the flexible display panel 100 and the terminal device may further include wireless connection, which avoids the trouble caused by connection lines between the flexible display panel 100 and the terminal device. In some embodiments, the terminal device further may be directly integrated within the flexible display panel 100. The terminal device includes but is not limited to a mobile phone, a computer, a television, a keyboard, an e-book, a vehicle-mounted display terminal, and so on.

In some embodiments, the flexible display panel 100 may be connected with a movement mechanism of the terminal device, and the movement mechanism may drive the flexible display panel 100 to perform a sliding movement relative to the terminal device. In some embodiments, the display apparatus 1000 may include a rotating shaft 200, the flexible display panel 100 may be connected with the rotating shaft 200, and the rotation of the rotating shaft 200 may drive the flexible display panel 100 to perform a winding movement on the terminal device. More descriptions of the winding and sliding movements of the flexible display panel can be found elsewhere in the present application (for example, FIGS. 10, 11 and 14, 15 and related descriptions).

The beneficial effects that may be brought about by one or more embodiments disclosed in the present application include, but are not limited to: (1) the flexible display panel has a relatively low stiffness in the bending direction, which facilitates the bending of the flexible display panel; (2) at least one end of the flexible display panel along the bending direction (the first direction or the second direction) is provided with the extension portion for connecting with the rotating shaft or the movement mechanism, so that when the flexible display panel is fully unfolded, the display layer of the flexible display panel can be fully or with the largest possible area, located on the front of the flexible display panel, so that the display region of the flexible display panel can present images to the user with the largest possible area, thereby maximizing the use of the display area of the flexible display panel; (3) the flexible display panel has a relatively high stiffness in the non-bending direction, and can keep the display surface of the flexible display panel flat when the flexible display panel is unfolded; (4) when the flexible display panel is provided with the extension portion, the filling layer makes up for the thickness of the extension portion, so that the overall thickness of the flexible display panel is consistent, and the filling layer can further prevent the end of the display layer from splitting when the flexible display panel moves, and also can creep when the flexible display panel moves, to compensate for the deformation of the display layer and avoid a poor display effect of the flexible display panel caused by the deformation of the display layer.

The above are only the preferred embodiments of the present application, and are not intended to limit the present application, and any modifications, equivalent replacements, improvements and the like made within the spirit and principle of the present application, should be included in the protective scope of the present application.

What is claimed is:

1. A flexible display panel comprising:
    a display layer and
    a layer group, wherein the layer group comprises an upper layer group located above the display layer; the upper layer group further comprises:
    a cover plate layer that has a length in the first direction greater than a length of the display layer.

2. The flexible display panel according to claim 1, wherein the layer group further comprises:
    a lower layer group located below the display layer, the at least one layer comprises a plurality of layers, the upper layer group comprises at least one layer of the plurality of layers; the lower layer group comprises at least another layer of the plurality of layers, and at least one of the at least one layer of the upper layer group and the at least another layer of the lower layer group has the length in the first direction greater than the length of the display layer in the first direction.

3. The flexible display panel according to claim 1, wherein the layer group comprises a lower layer group located below the display layer; the lower layer group comprises the at least one layer of the at least one layer of the layer group has the length in the first direction greater than the length of the display layer in the first direction.

4. The flexible display panel according to claim 2, wherein the lower layer group further comprises:
    a support layer that has a length in the first direction greater than the length of the display layer.

5. The flexible display panel according to claim 2, wherein the lower layer group further comprises:
    a support layer that has a length in the first direction greater than the length of the display layer.

6. The flexible display panel according to claim 5, further comprising:
    a filling layer located below an extended portion of the cover plate layer relative to the display layer.

7. The flexible display panel according to claim 6, wherein a sum of a thickness of the extended portion of the cover plate layer, a thickness of the extended portion of the support layer, and a thickness of the filling layer is the same as a thickness of a non-extending region of the flexible display panel.

8. The flexible display panel according to claim 2, wherein a range of a length difference between the at least one layer of the upper layer group and the display layer in the first direction comprises a first range from 0.5 cm to 5 cm; and
a range of a length difference between the at least one layer of the lower layer group and the display layer in the first direction comprises a first range from 0.5 cm to 5 cm.

9. The flexible display panel according to claim 2, wherein a range of a length difference between the at least one layer of the upper layer group and the display layer in the first direction comprises a second range from 1 cm to 4 cm; and
a range of a length difference between the at least one layer of the lower layer group and the display layer in the first direction comprises a second range from 1 cm to 4 cm.

10. The flexible display panel according to claim 2, wherein the at least one layer of the upper layer group comprises a plurality of layers, the at least one layer of the lower layer group comprises a plurality of layers, the plurality of layers of the upper layer group and/or the lower layer group extend in the first direction with the same length relative to the display layer.

11. The flexible display panel according to claim 2, wherein an extended portion of the upper layer group and relative to the display layer is disposed at one of ends of the display layer in the first direction.

12. The flexible display panel according to claim 2, wherein extended portions of the upper layer group relative to the display layer are disposed at two ends of the display layer in the first direction.

13. The flexible display panel according to claim 2, further comprising:
a flexible circuit board connected to an end of the display layer away from an extended portion of at least one of the upper layer group.

14. The flexible display panel according to claim 1, wherein an extended end of the flexible display panel in the first direction is configured to connect with a terminal device.

15. The flexible display panel according to claim 1, wherein an extended end of the flexible display panel in the first direction is configured to connect with a rotating shaft.

16. A display apparatus, comprising the flexible display panel according to claim 1, and a terminal device connected with the flexible display panel.

17. The display apparatus according to claim 16, wherein the flexible display panel performs a sliding movement relative to the terminal device.

18. The display apparatus according to claim 16, wherein the flexible display panel performs a winding movement around a rotating shaft on the terminal device.

19. The flexible display panel according to claim 5, further comprising:
a filling layer located above an extended portion of the cover plate layer relative to the display layer.

20. The flexible display panel according to claim 2, wherein an extended portion of the lower layer group relative to the display layer is disposed at one end of the display layer in the first direction.

21. The flexible display panel according to claim 2, wherein extended portions of the lower layer group relative to the display layer are disposed at two ends of the display layer in the first direction.

22. The flexible display panel according to claim 2, further comprising:
a flexible circuit board connected to an end of the display layer away from an extended portion of at least one of the lower layer group.

* * * * *